United States Patent
Fulga et al.

(10) Patent No.: US 7,516,428 B2
(45) Date of Patent: Apr. 7, 2009

(54) MICROWAVE CIRCUIT PERFORMANCE OPTIMIZATION BY ON-CHIP DIGITAL DISTRIBUTION OF OPERATING SET-POINT

(75) Inventors: Stefan Fulga, Ottawa (CA); Paul Wallis, Ottawa (CA)

(73) Assignee: Sige Semiconductor (Europe) Limited, Bishop's Stortford, Hertfordshire (GB)

( * ) Notice: Subject to any disclaimer, the term of this patent is extended or adjusted under 35 U.S.C. 154(b) by 495 days.

(21) Appl. No.: 11/431,539

(22) Filed: May 11, 2006

(65) Prior Publication Data

US 2007/0266350 A1  Nov. 15, 2007

(51) Int. Cl.
*G06F 17/50* (2006.01)
(52) U.S. Cl. .................. 716/4; 716/1; 716/5
(58) Field of Classification Search .......... 716/1–5
See application file for complete search history.

(56) References Cited

U.S. PATENT DOCUMENTS

| | | | |
|---|---|---|---|
| 4,921,814 A | 5/1990 | Ishikawa et al. | |
| 4,990,973 A | 2/1991 | Ishikawa et al. | |
| 5,467,063 A | 11/1995 | Burns et al. | |
| 5,705,962 A | 1/1998 | Fleeger et al. | |
| 5,812,035 A | 9/1998 | Fleeger et al. | |
| 6,965,241 B1 | 11/2005 | Liu et al. | |
| 7,129,746 B1 * | 10/2006 | Balasubramanian et al. | .. 326/38 |
| 7,352,206 B1 * | 4/2008 | Zhu et al. | ...... 326/38 |
| 7,362,131 B2 * | 4/2008 | Balasubramanian et al. | .. 326/38 |
| 7,421,605 B2 * | 9/2008 | Balasubramanian et al. | 713/340 |

FOREIGN PATENT DOCUMENTS

WO   WO 01/13527 A1   2/2001

* cited by examiner

*Primary Examiner*—Sun J Lin
(74) *Attorney, Agent, or Firm*—Freedman & Associates

(57) ABSTRACT

A method and circuit are outlined allowing the performance of an RF circuit to be established through the use of digital calibration data, which is stored within a programmable memory store and used to establish the control signal inputs of the RF circuit elements.

77 Claims, 18 Drawing Sheets

MICROWAVE CIRCUIT PERFORMANCE OPTIMIZATION BY ON-CHIP DIGITAL DISTRIBUTION OF OPERATING SET-POINT

FIELD OF THE INVENTION

The invention relates to the field of microwave circuits and in particular to establishing operating conditions for desired performance and then storing and using in digital format calibration data establishing said conditions.

BACKGROUND

In recent years, the use of wireless and microwave technology has increased dramatically in consumer applications as well as commercial applications. This has resulted in a proliferation of portable and hand-held units, where such units are deployed by a variety of individuals from soldiers on the battlefield to mothers contacting their children. The uses of wireless and microwave technology are widespread, increasing, and include but are not limited to radio, telephony, Internet e-mail, Internet web browsers, global positioning, wireless computer peripherals, wireless networks, security tags and in-store navigation.

Within any microwave circuit using microwave signals there is a highly sensitive chain of microwave electronics providing both the transmission and receiver functions. These microwave circuits generally necessitate not only direct manipulation of the microwave signal, for example by amplification, attenuation, mixing or detection, but also ancillary functions such as power monitoring, signal identification, and control. Additionally these functions may be undertaken post mixing, such that the signals are at a lower frequency, typically referred to as Intermediate Frequency (IF), than the original received signal. The latter includes, for example, the extraction of modulated information for radio, telephony, data or video signals from their carriers in wireless or satellite networks, to inventory management with RFID, and analog signal identification and analysis from microwave carriers in military applications such as missile threat detection.

In the manufacturing of devices for these applications there are continued demands for lower cost, increased performance, increased volume and enhanced flexibility from the microwave circuits. These demands have resulted in a wide range of microwave circuits, both those built from discrete elements or those using monolithic microwave integrated circuits. Additionally the leveraging of semiconductor manufacturing approaches has resulted in suppliers of microwave circuits who have their own manufacturing operations-fabrication facility (Fab) and those who access commercial manufacturing operations (Foundry) and are known as Fabless operations. Fabless operations therefore are generally designing to a pre-defined manufacturing process flow with defined tolerances and constraints, typically referred to as design rules. For example, IBM offers foundry access for RF CMOS products with three sets of design rules CMOS 6RF©, CMOS 7RF©, and CMOS 8RF©. These are based upon three different lithography processes, 250 nm, 180 nm and 130 nm respectively, along with design, metallization and layout rules.

In many instances the Fabless companies are accessing Foundry operations of a corporation having its own fabrication facility and offering products within similar markets. Typically, the external Fabless businesses access the Foundry with an older set of design rules, whereas the Foundry's internal groups access newer improved rules, processes, as well as being allowed to breach layout design rules for improved performance, lower cost and increased competitive edge.

It is well know to those skilled in the art that for either internal designer or Fabless based designer that the run to run variances in the manufacturing processes of the semiconductor facility result in variations of many basic parameters of the circuits as well as the underlying qualities of the technology elements such as transistors, resistors, capacitors and inductors. Such technology elements are considered the elemental devices of the semiconductor technology. It is not uncommon for Fabless design rules to set tolerances of ±25% to a resistor value for a specific process on their older design rules. Thus, a resistor implemented in the circuit with an intended value of 100 Ohms might be as low as 75 Ohms or as high as 125 Ohms in one or more lots of the final manufactured circuit. The result of the resistor tolerance is that the manufactured product on a set of design rules has a distribution around the nominal design value. As basic microwave device elements, such as transistors, move away from their nominal design point, critical performance characteristics might degrade such as gain, output power, linearity, noise figure, and bandwidth.

A designer working with these design rules must either design a product that works to specification over the full tolerance range, thereby having a high yield but with a reduced specification, or accept a reduced yield with improved specification. This is a trade-off that is well known in the art of circuit design. For microwave circuits, the manufacturing variations requires the functional testing of the microwave circuit to decide whether the part has passed or failed to fulfill the component specification. In fact, the common practice of offering two or more specifications for a product is an attempt by a business to generate additional revenue for parts at lower specifications.

For monolithic microwave integrated circuits (MMICs), it is also well known to those skilled in the art that the approximately optimal bias voltage for a transistor, the core building block of many MMICs such as amplifiers and attenuators, varies with the exact semiconductor materials, semiconductor processes employed in manufacturing and the resulting device geometry and parameters. Within semiconductor manufacturing these parameters vary even across a single wafer, which can contain hundreds to thousands of microwave circuit die. Hence, even a single wafer results in a distribution of performance around a median value. If this median is sufficiently far from the nominal design point for a designer working with reduced tolerances against a Foundry process, then the result may be that the yield of that entire wafer, or that entire batch of wafers of several tens of thousands of parts might be zero or extremely low causing the business supply issues and customer dissatisfaction.

It is advantageous therefore in reaching a design with high performance and low cost for the effective design range of the Foundry process to be reduced. It is known that whilst within a single wafer every transistor, for example, has a discrete optimal operating point that varies according to the transistors position within the wafer, these variations are gradual and that typically therefore for a monolithic microwave integrated circuit each die has a significantly reduced variation.

It is known from prior art to exploit the dependence of the performance of the microwave circuit on bias point and individually tune every microwave circuit for bias voltage such that the circuits operate from a single specified power supply, thereby eliminating the cost to the device user of tuning the imperfect manufacturing out. Such an approach is typically accomplished through the use of laser trimming in a resistive divider network within the microwave circuit. The derivation of the optimal setting of the resistive divider made from the microwave characterization of the microwave circuit. This step requiring not only time and labor but also significant expenditure in complex microwave test instruments.

It would be advantageous, to derived the optimal settings from information requiring reduced time, labor and eliminating complex and expensive microwave test equipment. Further, it would be advantageous if the manufacturer could use the information to adjust multiple control settings within the microwave circuit such that it meets the desired exacting specification without reduced yield. Finally it would be advantageous if the adjustment of the necessary control settings were performed by the circuit automatically.

SUMMARY OF THE INVENTION

In accordance with the invention there is provided a method comprising: (a) providing an integrated circuit for performing a first circuit function and responsive to a control signal, the integrated circuit having a first operating characteristic; (b) providing at least one elemental device; (c) providing a known current or voltage to the at least one elemental device; (d) measuring one or more elemental device parameters of the at least one elemental device while the known current or voltage is applied thereto; (e) determining data for; when stored within a memory store and utilized by a control signal generating circuit, results in a first control signal for application as approximately the control signal; and, (f) storing the data within the memory store.

In accordance with another aspect of the invention there is provided an apparatus comprising: an integrated circuit comprising: a programmable memory store for storing of calibration data; a control circuit for providing at least a first analog control signal in response to the calibration data, the at least a first analog control signal different for different calibration data stored within the programmable memory store; and, a first circuit for performing a first circuit function having a performance responsive to the at least a first analog control signal, the performance of the first circuit function different in response to different at least a first analog control signal, the calibration data determined in response to providing a known voltage or current to at least one elemental device and measuring a characteristic of the at least one elemental device and for providing the first analog control signal from the control signal and providing approximately a predetermined performance of the first circuit.

In accordance with yet another aspect of the invention there is provided a storage medium having stored therein data for when executed resulting in a circuit design for an integrated circuit comprising: an integrated circuit for performing a first circuit function and responsive to a control signal, the integrated circuit having a first operating characteristic; a memory store; a circuit for providing a known current or voltage to at least one elemental device; a circuit for measuring one or more elemental device parameters of the at least one elemental device while the known current or voltage is applied thereto; a circuit for determining data for; when stored within a memory store and utilized by a control signal generating circuit, results in a first control signal for application as approximately the control signal; and, a circuit for storing the data within the memory store.

BRIEF DESCRIPTION OF THE DRAWINGS

Exemplary embodiments of the invention will now be described in conjunction with the following drawings, in which.

DETAILED DESCRIPTIONS OF THE DRAWINGS

Figure 1:
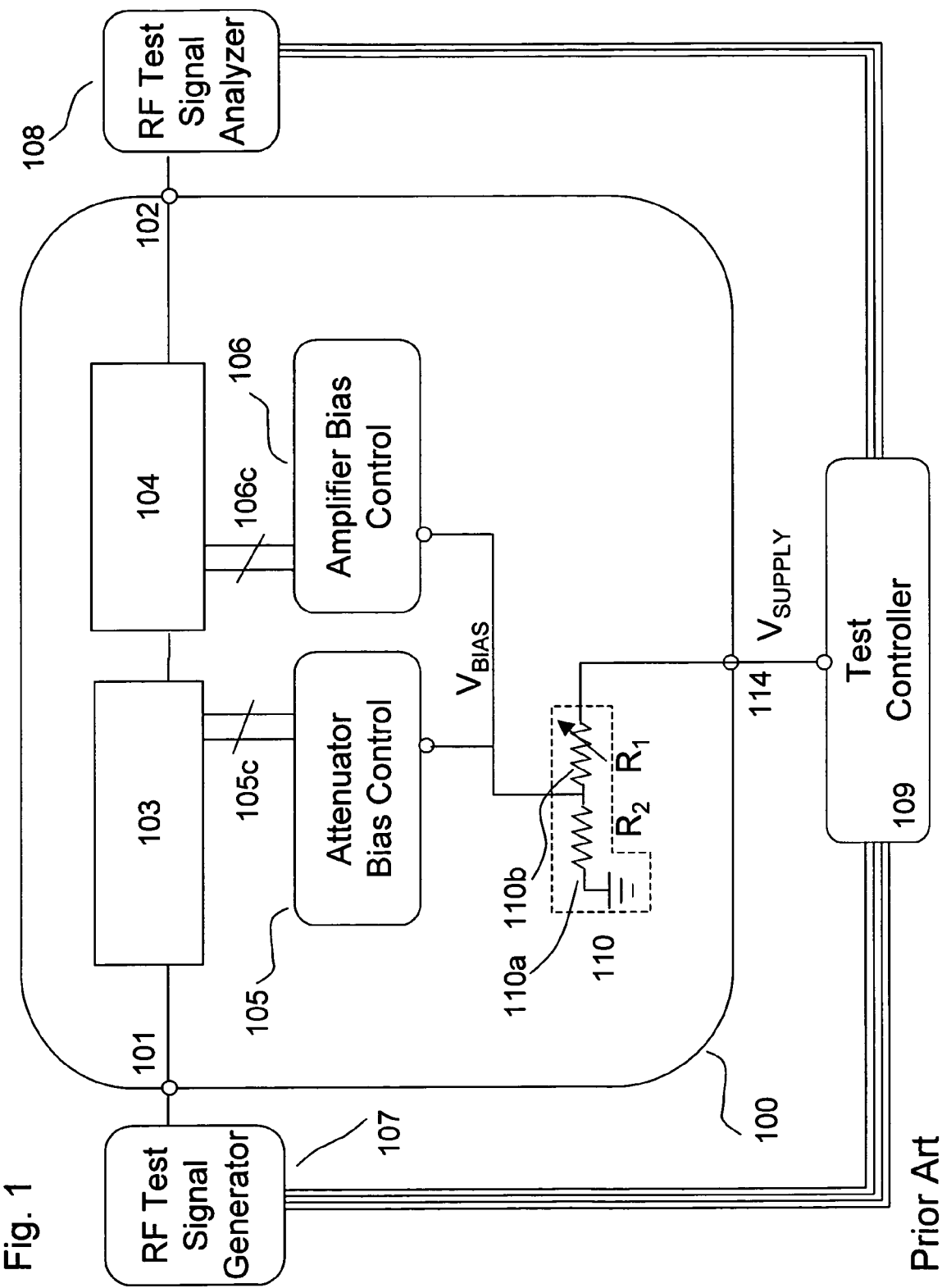
FIG. 1 illustrated is a prior art test configuration for the measurement of a microwave circuit 100 RF performance and adjustment to account for manufacturing variations.

Referring to FIG. 1 illustrated is a prior art test configuration for the measurement of a microwave circuit 100 RF performance and adjustment to account for manufacturing variations. The microwave circuit 100 comprises an RF input port 101, which is electrically coupled, in this illustration, to an attenuator element 103 and an amplifier element 104. The output port of the amplifier element 104 is electrically coupled to RF output port 102.

The attenuator element 103 is electrically coupled to an attenuator bias control circuit 105, and the amplifier element 104 is electrically coupled to an amplifier bias control circuit 106. Both the attenuator bias control circuit 105 and amplifier bias control circuit 106 is electrically coupled to a power supply port 114 via a resistive divider 110.

Externally coupled to the microwave circuit 100 are an RF test signal generator 107 at the RF input port 101, an RF test signal analyzer 108 at the RF output port 102 and a test controller 109 at the power supply port 114. The test controller 109 establishes a test protocol for the microwave circuit 100 wherein it is excited according to desired testing such that it might be addressed with a range of input RF frequencies from the RF test signal generator 107, a range of input powers, or a combination thereof. Said excitation as set by the test controller 109. At each excitation the RF test signal analyzer 108 performs a characterization of the output of the microwave circuit 100, which optionally includes harmonic analysis, power measurement, noise floor, distortion etc. The results are communicated to the test controller 109.

As shown the test controller 109 applies an initial DC voltage to the microwave circuit 100 at the power supply pod 114. This is electrically coupled to the attenuator bias control circuit 105 and amplifier bias control circuit 106 by the resistive divider 110. After each set of microwave measurements the test controller optionally resets the DC voltage to the microwave circuit 100 at the power supply port 114. Based upon the nominal values of the upper half of the resistive divider 110b, and the lower half of the resistive divider 110a the applied DC voltage ($V_{SUPPLY}$) is resistively divided to the attenuator bias control circuit 105 and amplifier bias control circuit 106 ($V_{BIAS}$). Initially the voltage coupled is $V_{BIAS}=V_{SUPPLY}*R_2/(R_1+R_2)$.

Based upon the sequential adjustment of the DC voltage from the test controller 109 and microwave characterization using the RF test signal generator 107 and RF test signal analyzer 108. The optimum $V_{BIAS}$ is derivable. Based upon the known value of $V_{SUPPLY}$ specified for the microwave circuit 100 when integrated into the intended application the appropriate value of $R_1$ is defined. The resistive element 110b is then laser trimmed on a second laser trimming station to reach the intended value $R_1$.

Figure 2:
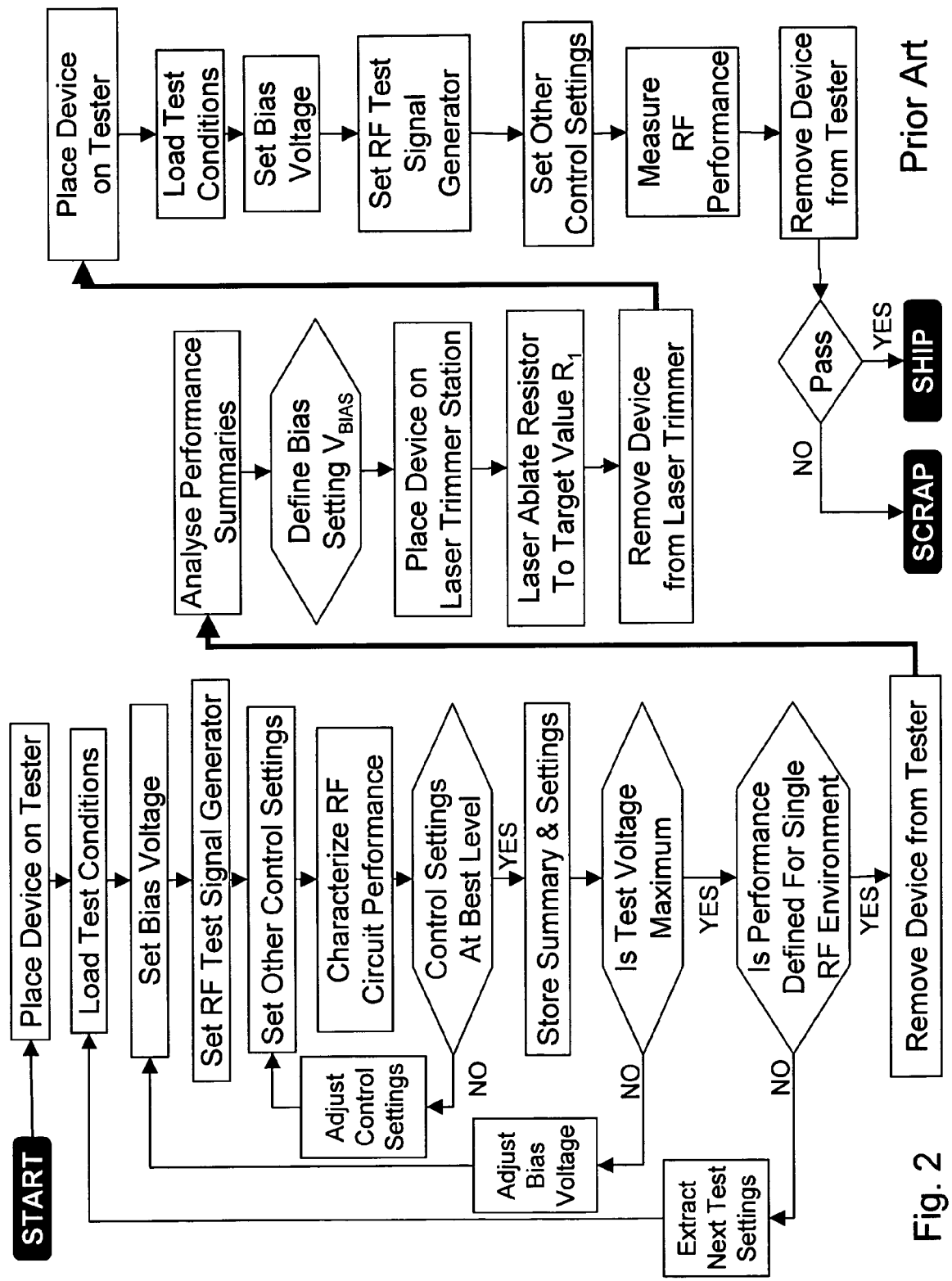
FIG. 2 shown is the exemplary flow diagram of the test algorithm used in the test configuration outlined in FIG. 1.

Referring to FIG. 2 shown is the exemplary flow diagram of the test algorithm used in the test configuration outlined in FIG. 1. In the exemplary flow diagram shown the testing loop for the microwave circuit has three nested loops. The first loop is for overall test conditions as the microwave circuit is often intended for operation in two or more frequency regimes, such as a cellular telephone for global roaming is required to operate on one of quad-bands (GSM 850 MHz/950 MHz and GPRS 1800 MHz/1900 MHz).

The second loop is the sequential adjustment of $V_{SUPPLY}$ to derive the optimum bias voltage for each of the quad bands. The third loop is the adjustment of control settings, which comprise, for example, the variation in attenuator setting for the specific example of the microwave circuit 100 in FIG. 1. Additional loops might also be required such as varying the modulation depth of the microwave signal applied to the circuit or adjusting the RF power. Once the multiple control loops have been executed the device is removed from the microwave tester and the performance summaries of the multiple loops analyzed to define the appropriate value of $V_{BIAS}$ for which the microwave circuit performs to test specification requirements. From here the circuit is placed into a laser trimming workstation, which ablates the material on resistor 110b such that the correct $V_{BIAS}$ is applied when the microwave circuit 100 was powered with the as specified voltage $V_{SUPPLY}$ for the intended application, e.g. 3.3V.

In the exemplary flow diagram the device is then removed from the laser trimming workstation and placed into a second tester. In this example the second tester performs a single test to provide a measurement of the post trimming performance of the microwave circuit 100. Based upon the result of this test the circuit is scrapped or shipped.

Figure 3:
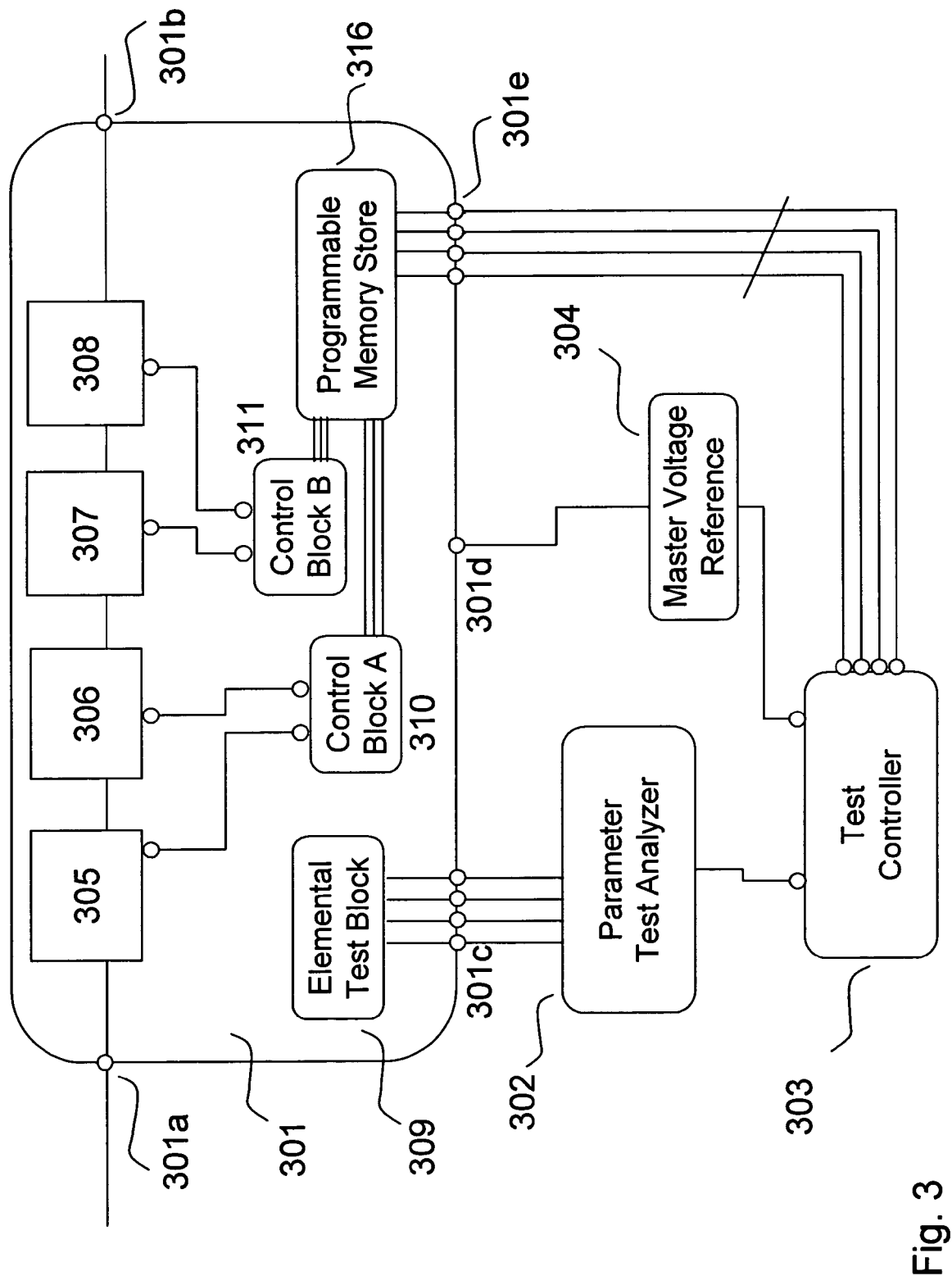
FIG. 3 is an illustration of a first embodiment of the invention wherein a DC master voltage reference and DC parametric characterization of elemental device parameters are used to derive the optimum device control settings of the microwave circuit from software circuit models and store these settings digitally within the microwave circuit.

Shown in FIG. 3 is an illustration of a first embodiment of the invention wherein a DC master voltage reference 304 and DC parametric characterization of elemental device parameters from element test devices within an elemental test block 309 is used to derive the optimum device control settings of the microwave circuit 301 from software circuit models and store these settings digitally within the microwave circuit 301.

The microwave circuit 301 is shown having an RF signal path from an RF input port 301a to an RF output port 301b. Electrically disposed between the RF input port 301a and RF output port 301b are four microwave circuit elements 305 to 308. Microwave circuit elements 305 and 306 are electrically coupled to a first control block 310 whilst microwave circuit elements 307 and 308 are electrically coupled to a second control block 311. Each of the first and second control blocks 310 and 311 is further electrically coupled to a programmable memory store 316. The microwave circuit elements 305 to 308 are coupled to the voltage supply port 301d.

Also disposed within the microwave circuit 301 is an elemental test block 309, which is also electrically coupled to the voltage supply port 301d. As shown the elemental test block 309 is not electrically coupled to the microwave circuit elements 305 to 308 and hence does not form part of the RF signal path between RF input port 301a and RF output port 301b.

The voltage supply port 301d is shown electrically coupled to a master voltage reference 304. Elemental test ports 301c of the elemental test block 309 are electrically coupled to parameter test analyzer 302. The parameter test analyzer 302, master voltage reference 304 and interface 301e of the programmable memory store 316 are all electrically coupled to the test controller 303.

At initiating the test protocol the test controller sets the master voltage reference 304 to a predetermined value. The elemental test devices within the elemental test block 309 are then energized such that the parameter test analyzer 302 measures their DC parametric characteristics. The results are transferred to the test controller 303. In one embodiment of the invention, the DC parametric characteristics are used within a look up table to define the appropriate control settings of the first and second control blocks 310 and 311. The requisite calibration data defining the appropriate control settings is then transferred via interface 301e and programmed into the programmable memory store 316.

The applied voltage in the test protocol provided by the master voltage reference 304 does not necessarily lie within the target operating voltage range of the microwave circuit 301 but is optionally defined at a value wherein the elemental device characteristics are at their most sensitive.

Further the actual elements within the elemental test block 309 are optionally varied according to the microwave circuit 301, and optionally include but are not limited to resistive elements, inductors, capacitors, and transistors of one or more designs, current sources and oscillators. Electrical pads on the integrated circuit die, are optionally multiplexed with the actual device electrical pads for the integrated circuit die.

Additionally whereas the embodiment disclosed relied upon a look up table to define the appropriate control setting and then the calibration data the look up table might simply provide the calibration data directly. Alternatively the appropriate control setting and/or calibration data might be derived from the execution of software models of the microwave circuit, or elemental devices, which optionally includes proprietary software models as well as commercially available modeling tools.

Also, the elemental device measurements are typically made on bare die, but if the pads were multiplexed to other active pads then the calibration is undertaken on packaged components either instead of or in addition to testing on bare die.

Figure 4:
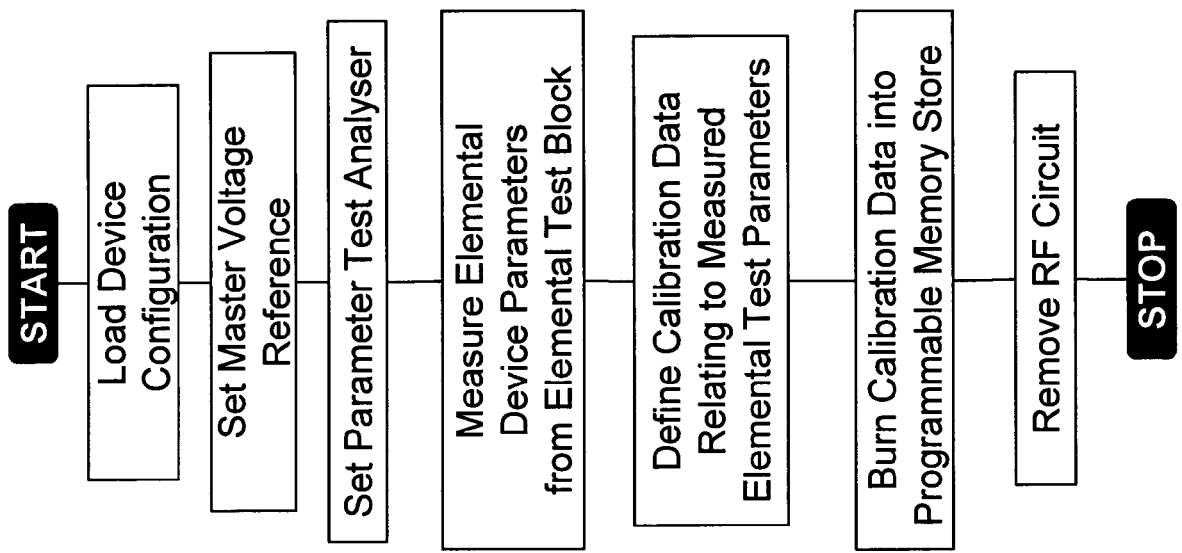
FIG. 4 is an exemplary flow chart for the testing and analysis of a microwave circuit based upon the embodiment disclosed in FIG. 3.

FIG. 4 is an exemplary flow chart for the testing and analysis of a microwave circuit based upon the embodiment disclosed in FIG. 3. This embodiment using the DC master voltage reference, DC parametric characterization and software circuit models to derive and store within the circuit the appropriate control setting for the microwave circuit. As can be seen from the exemplary flow diagram when compared to the prior art shown in FIG. 2 the embodiments offer a considerable reduction in the number of steps, as described in the first embodiment a single DC measurement, rather than a multiple set of nested loops of test and device settings. Potentially this is reduced to a single parameter of a single elemental test device as the models and correlations are built over time by the design group.

Figure 5:
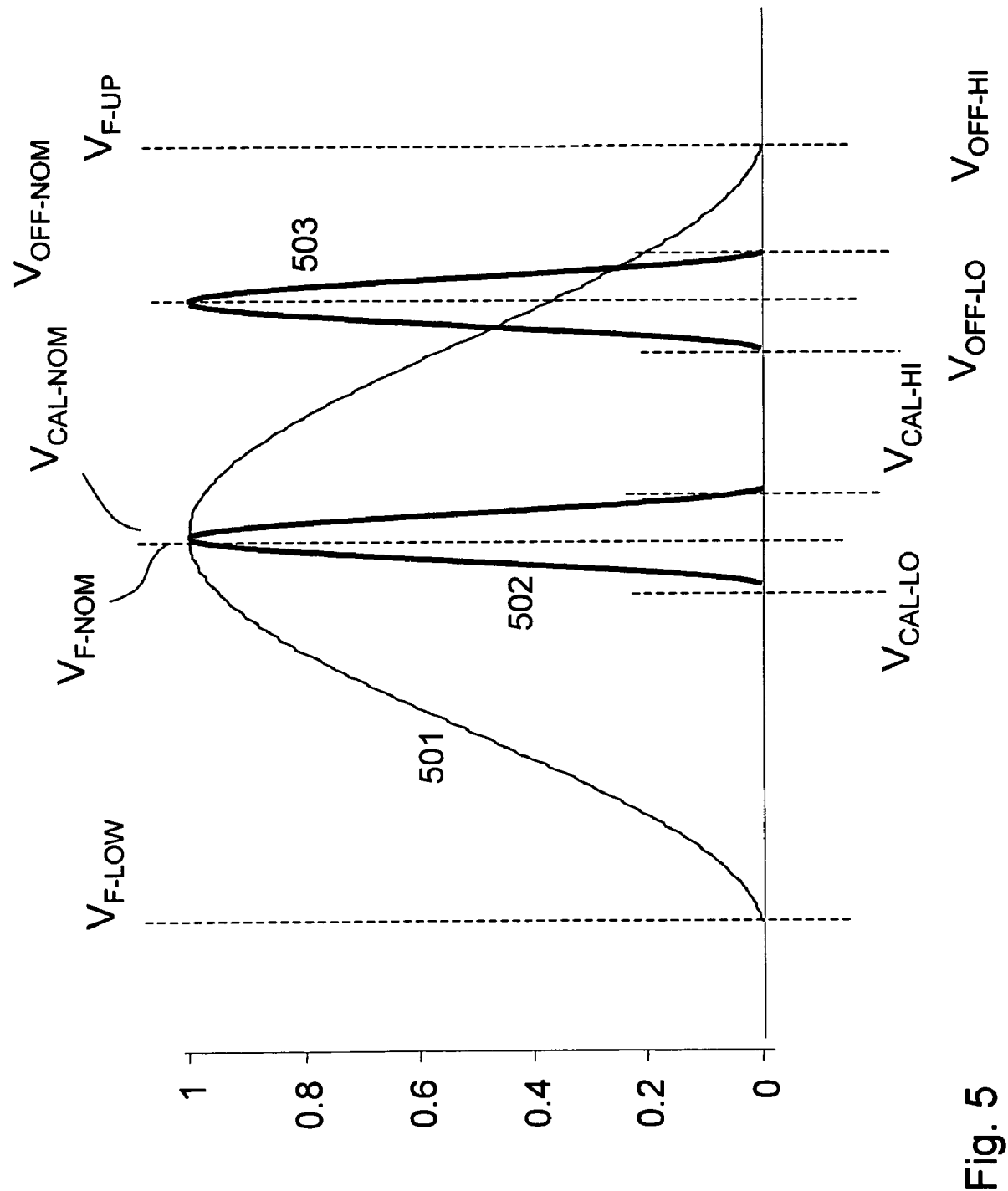
FIG. 5 is an exemplary distribution curve for a device parameter according to the prior art and an embodiment of the invention.

FIG. 5 is an exemplary distribution curve for a device parameter according to the prior art and an embodiment of the invention. Plotted is a probability distribution for a control signal of an exemplary microwave circuit, in this case optimal bias voltage to a transistor, shown as a linear function of voltage. Shown first are the manufacturing distribution limits of a Foundry process to which a designer might work. Shown are the nominal centre voltage, $V_{F-NOM}$, and the upper and lower limits of the process as specified, $V_{F-LOW}$ and $V_{F-UP}$. The resulting distribution of the bias voltage for a transistor on this design rule is shown as the plot 501.

Using the embodiment, after measurement of elemental device parameters and establishment of calibration data, the distribution curve achieved for the bias voltage is shown as plot 502. Here the same nominal centre was maintained, $V_{CAL-NOM}$, but the lower and upper limits of the manufactured devices is now considerably narrowed, shown by limits $V_{CAL-LO}$ and $V_{CAL-UP}$. Importantly if the performance of the microwave circuit is established to actually improve for a design bias voltage, which is other than the foundry nominal, shown as $V_{OFF-NOM}$, then the calibration data is established to centre the performance at this point. For example, this is a result of a change in the specification post-manufacturing, or the adjustment of several control signals to achieve the intended specification. The resulting distribution curve 503 is shown along with the resulting voltage limits $V_{OFF-LO}$ and $V_{OFF-UP}$ from the implementation of the calibration process.

Figure 6:
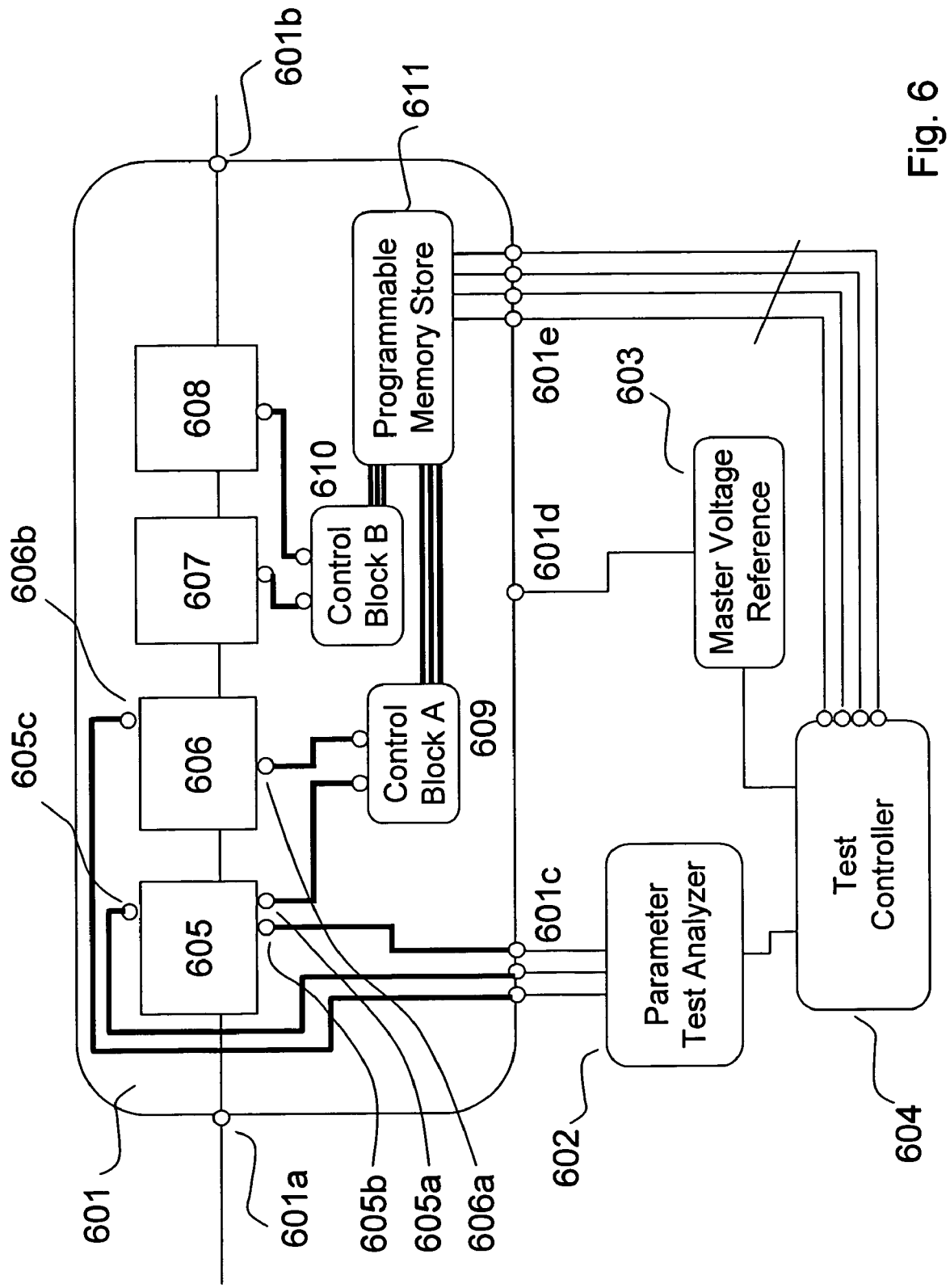
FIG. 6 is an illustration of a second embodiment wherein a DC master voltage reference and DC parametric characterization of elemental device parameters from functional elements within the active microwave circuit are used to derive the optimum device control settings of the microwave circuit from software circuit models and store these settings digitally within the microwave circuit.

FIG. 6 is an illustration of a second embodiment wherein a DC master voltage reference 603 and DC parametric characterization of elemental device parameters from functional elements within the active microwave circuit 601 is used to derive the optimum device control settings of the microwave circuit 601 from software circuit models and store these settings digitally within the microwave circuit 601.

The microwave circuit 601 is shown having an RF signal path from an RF input port 601a to an RF output port 601b. Electrically disposed between the RF input port 601a and RF output port 601b are four microwave circuit elements 605 to 608. Microwave circuit elements 605 and 606 are electrically coupled to a first control block 609 whilst microwave circuit elements 607 and 608 are electrically coupled to a second control block 610. Each of the first and second control blocks 609 and 610 is electrically coupled to a programmable memory store 611. The microwave circuit elements 605 to 608 also are coupled to the voltage supply port 601d.

Also disposed within the microwave circuit 301 is an elemental test interface 601c, which is electrically coupled to multiple points within the microwave circuit path defined by the microwave circuit elements 605 to 608. In the example embodiment the elemental test interface is coupled to three elements of the first microwave circuit element 605 at access points 605b and 605c. The elemental test interface further coupled to one element of the second microwave circuit element 606 at access point 606b.

The voltage supply port 601d is shown electrically coupled to a master voltage reference 603. Elemental test ports 601c are electrically coupled to parameter test analyzer 602. The parameter test analyzer 602, master voltage reference 603 and interface 601e of the programmable memory store 611 are all electrically coupled to the test controller 604.

At initiating the test protocol, the test controller sets the master voltage reference 603 to a predetermined value. The elemental test devices are then energized such that the parameter test analyzer 602 measures their DC parametric characteristics. The results are transferred to the test controller 604. In one embodiment of the invention the DC parametric characteristics are used within a look up table to define the appropriate control settings of the first and second control blocks 609 and 610. The requisite calibration data defining the appropriate control settings is then transferred via interface 601e and programmed into the programmable memory store 611.

The applied voltage in the test protocol provided by the master voltage reference 603 does not necessarily lie within the target operating voltage range of the microwave circuit 601 but is typically selected at a value wherein the elemental device characteristics are at their most sensitive—at a value wherein the test results provide an approximately maximum amount of information.

Figure 7:
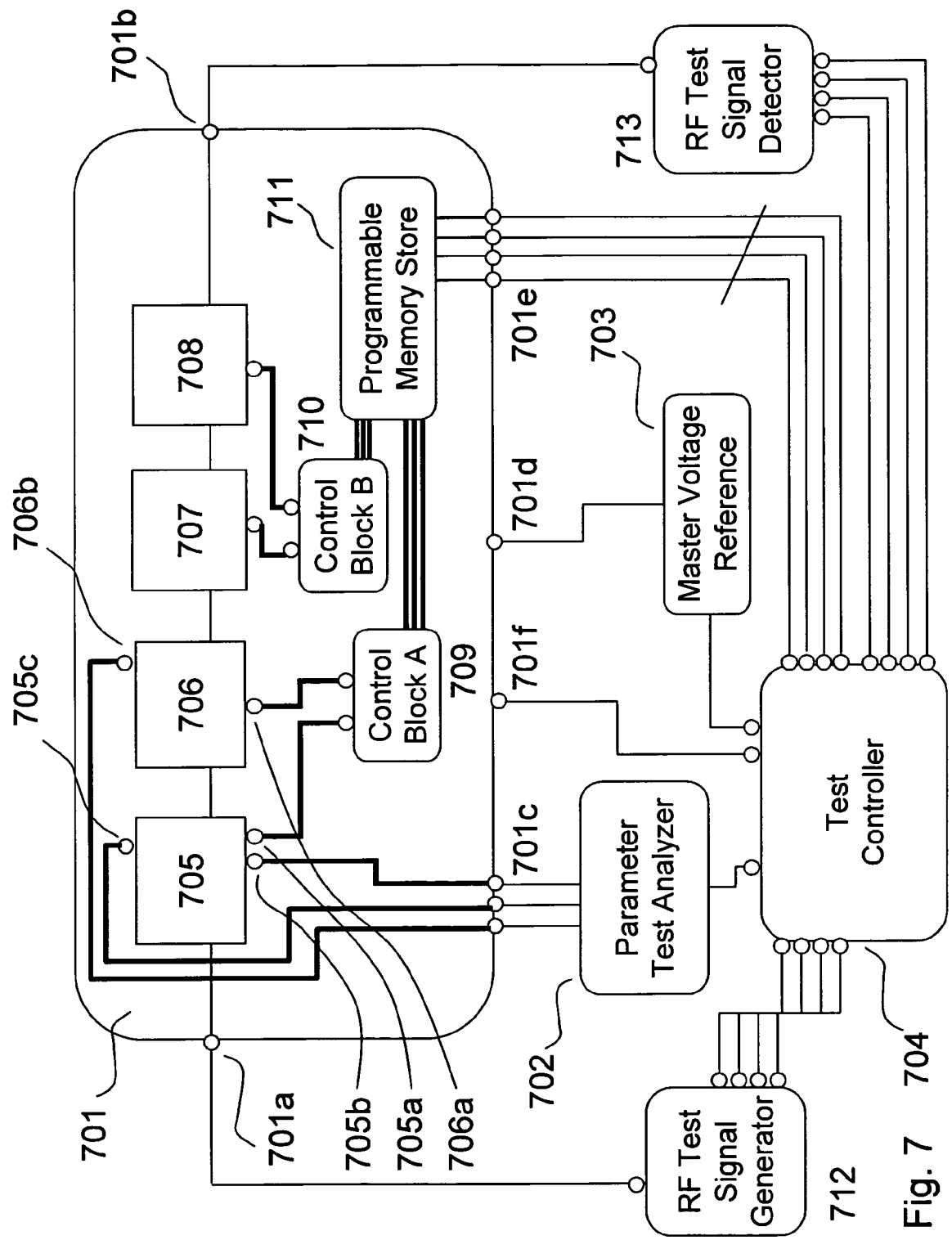
FIG. 7 is an illustration of a third embodiment of the invention wherein after deriving and storing the optimum device control settings of the microwave circuit from software circuit models the circuit is RF tested to verify compliance.

FIG. 7 is an illustration of a third embodiment of the invention wherein after deriving and storing the optimum device control settings of the microwave circuit from software circuit models the circuit is RF tested to verify compliance.

The microwave circuit 701 is shown having an RF signal path from an RF input port 701a to an RF output port 701b. Electrically disposed between the RF input port 701a and RF output port 701b are four microwave circuit elements 705 to 708. Microwave circuit elements 705 and 706 are electrically coupled to a first control block 709 whilst microwave circuit elements 707 and 708 are electrically coupled to a second control block 710. Each of the first and second control blocks 709 and 710 is electrically coupled to a programmable memory store 711. The microwave circuit elements 705 to 708 also are coupled to the voltage supply port 701d.

Also disposed within the microwave circuit 701 is an elemental test interface 701c, which is electrically coupled to multiple points within the microwave circuit path defined by the microwave circuit elements 705 to 708. In the example embodiment the elemental test interface is coupled to three elements of the first microwave circuit element 705 at access point's 705b and 705c. The elemental test interface is further coupled to one element of the second microwave circuit element 706 at access point 706b.

The voltage supply port 701d is shown electrically coupled to a master voltage reference 703. Elemental test ports 701c are electrically coupled to parameter test analyzer 702. The parameter test analyzer 702, master voltage reference 703 and interface 701e of the programmable memory store 711 are all electrically coupled to the test controller 704. Also shown coupled to the test controller 704 are an RF test signal generator 712 and a RF test signal detector 713.

At initiating the test protocol the test controller sets the master voltage reference 703 to a predetermined value. The elemental test devices are then energized such that the parameter test analyzer 702 measures DC parametric characteristics. The results are transferred to the test controller 704. In one embodiment of the invention the DC parametric characteristics are used within a look up table to define the appropriate control settings of the first and second control blocks 709 and 710. The requisite calibration data defining the appropriate control settings is then transferred via interface 701e and programmed into the programmable memory store 711.

At this point the test controller 704 sets the master voltage controller 703 to set the voltage at the voltage supply port 701d to the defined supply voltage for the use of the microwave circuit 701. The test controller also establishes a set of RF input conditions at the RF input port 701a by setting the RF test signal generator 712 to appropriate signal conditions. The microwave circuit 701 establishes the appropriate control settings from the control blocks 709 and 710 in response a circuit enable trigger, applied to an enable/disable port 701f.

The test controller 704 then extracts the measurement of the output signal of the microwave circuit 701 with the RF test signal detector 713 coupled to the RF output port 70 1b. The resulting comparison of the measured output signal at port 701b against the input signal 701a is used to establish verification of the calibration process, accumulate statistics for distribution of corrected device performance or as the input value to a second iteration of the software model analysis to provide a refinement of the calibration data. For example the first model calibration establishes a digital control word to the fourth Least Significant Bit (LSB) of the digital word, and the RF step provides calibration to the final LSB. Such decisions are a combination of cost—performance for the device manufacturer. Such testing is optionally performed on lot sampling, wafer sampling or other sampling basis as quality control verification.

Figure 8:
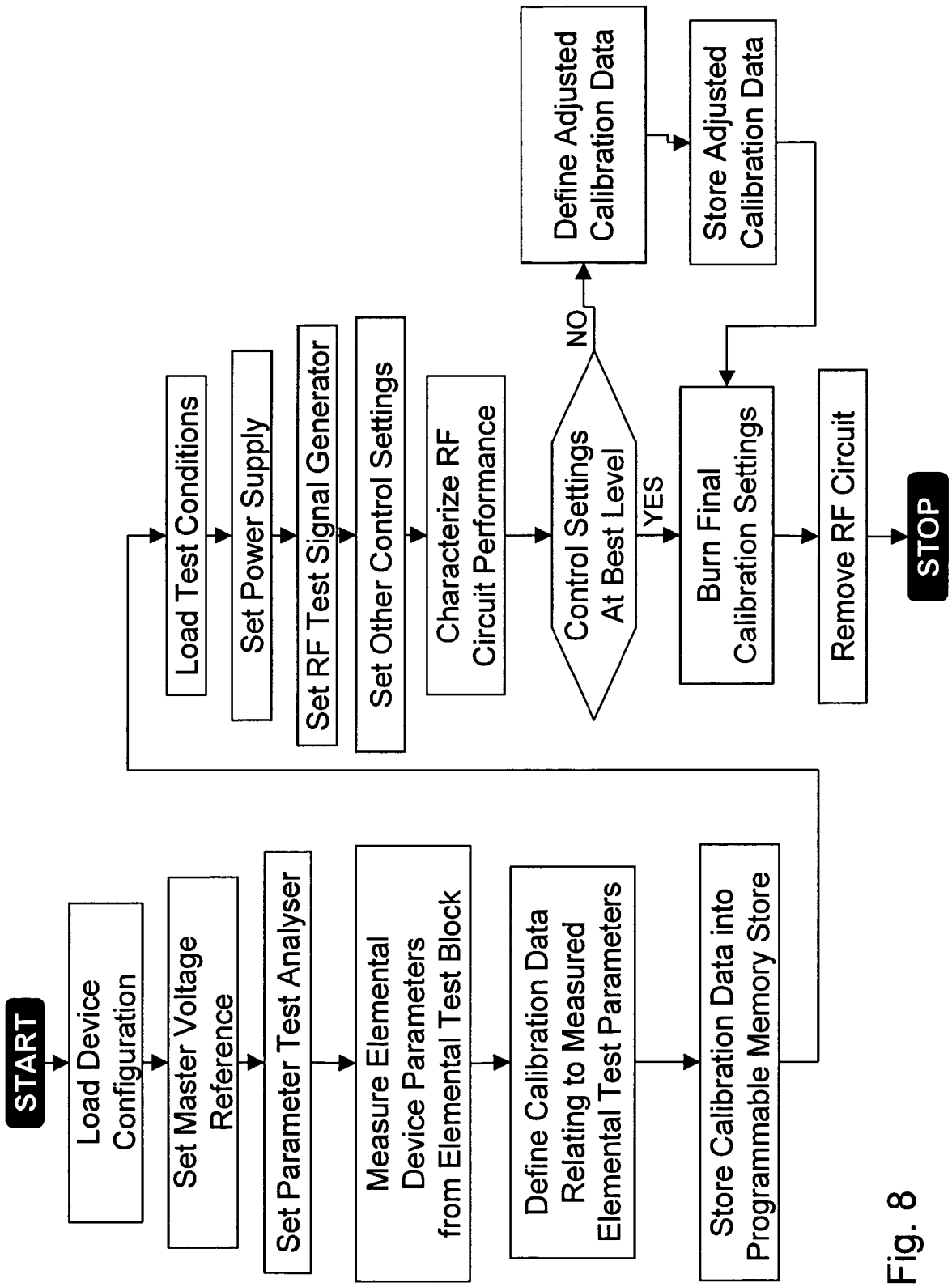
FIG. 8 is an exemplary flow diagram for the embodiment wherein after deriving and storing the optimum device control settings of the microwave circuit from software circuit models the circuit is RF tested to verify compliance.

FIG. 8 is an exemplary flow diagram for the embodiment wherein after deriving and storing approximately optimum device control settings of the microwave circuit from software circuit models the circuit is RF tested to verify compliance. As shown the second step of RF testing and adjusted calibration data is shown as a single pass-through. This loop is repeated until a certain performance level is achieved. The loop is optionally a nested loop wherein the calibration data for several control blocks is adjusted iteratively.

Figure 9A:
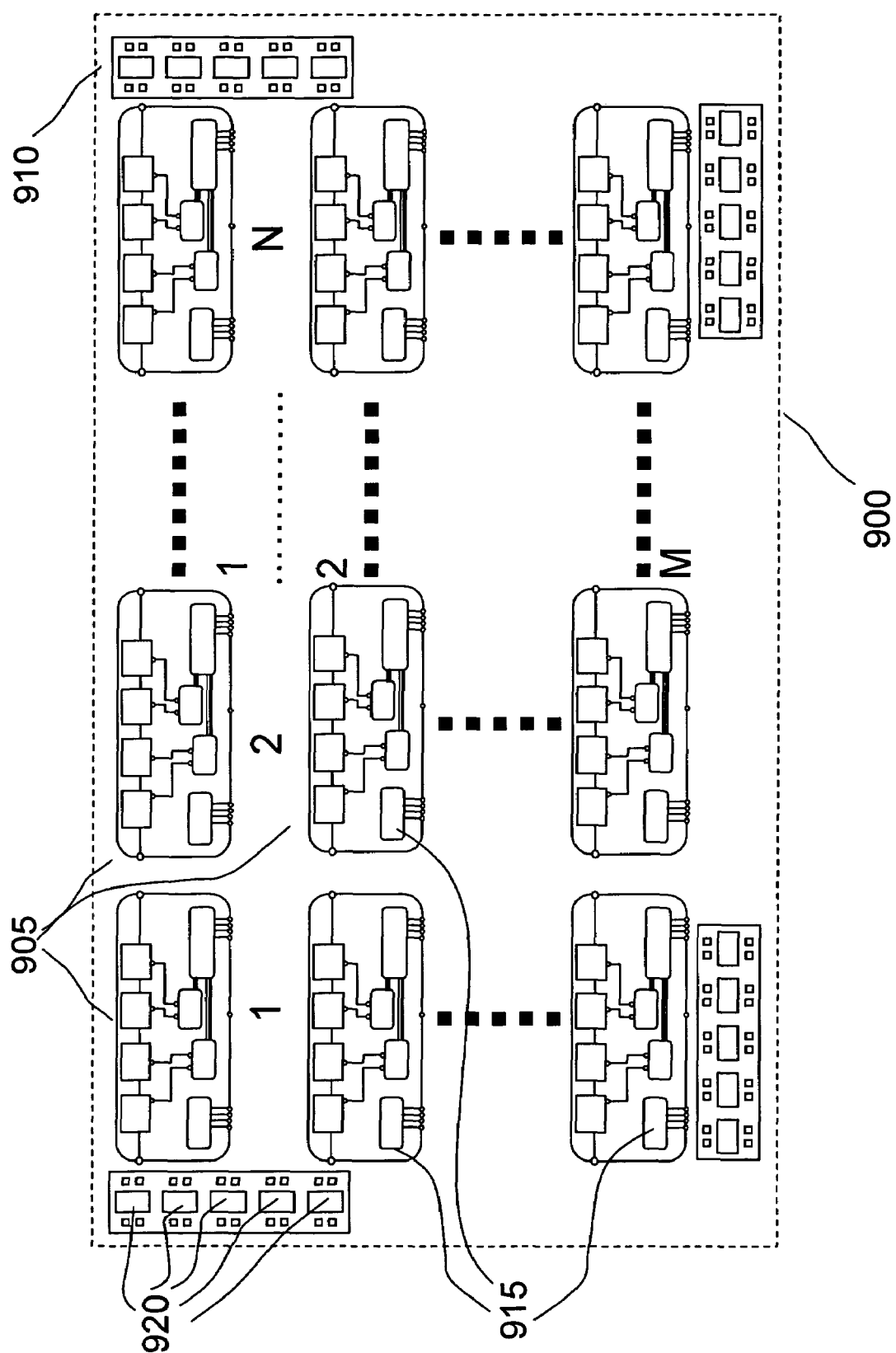
FIG. 9A illustrates an exemplary cell layout for within a semiconductor manufacturing facility, said cell containing multiple microwave circuits and elemental device test patterns Referring to FIG. 9B shown is an exemplary layout of a semiconductor wafer wherein the exemplary reticle block of FIG. 9A is replicated across the wafer.

FIG. 9A illustrates an exemplary cell layout for within a semiconductor manufacturing facility, said cell containing multiple microwave circuits and elemental device test patterns. Today's semiconductor manufacturing techniques and device geometries have required the adoption of projection lithography and reduction projection lithography as the linewidths and resolutions have gone below those achievable with contact lithography and electron-beam mask plates. Considering the previously discussed IBM CMOS 8 RF offers 130 nm linewidth capabilities, which is comparable to the 100 nm linewidth of an electron-beam lithography tool. Hence it has become common to generate what is known as a "reticle" rather than a mask plate (which is for 1:1 contact lithography) which is typically a 5 times multiplication. Hence the previous 130 nm line is now written on the reticle at 650 nm and reduced through optical projection lithography (albeit UV optics) to 130 nm on the wafer.

Optical aberrations of the imaging reduction process typically limit the reticle field which can be used to an area of 15-20 mm by 15-20 mm. Such a reticle field is shown as reticle block 900. Within this, the designer will place their device cells 905 into this packing as many cells into the reticle block 900 as feasible. Final device cost is inversely proportional to the die manufactured per wafer as the cost per wafer is generally fixed. Hence the reticle block 900 typically contains a matrix with M rows and N columns, where M and N are positive integers. Additionally the designer optionally introduces additional test structures 910 into the reticle block 900. Each of the device cells 905 as shown in FIG. 9A includes an elemental test block 915 such that the method is performed on the devices at the per die level, such as disclosed supra in respect of performing the test on final packaged parts.

Optionally the additional test structures 910 also include elemental test structures, such as shown by elemental test elements 920.

Figure 9B:
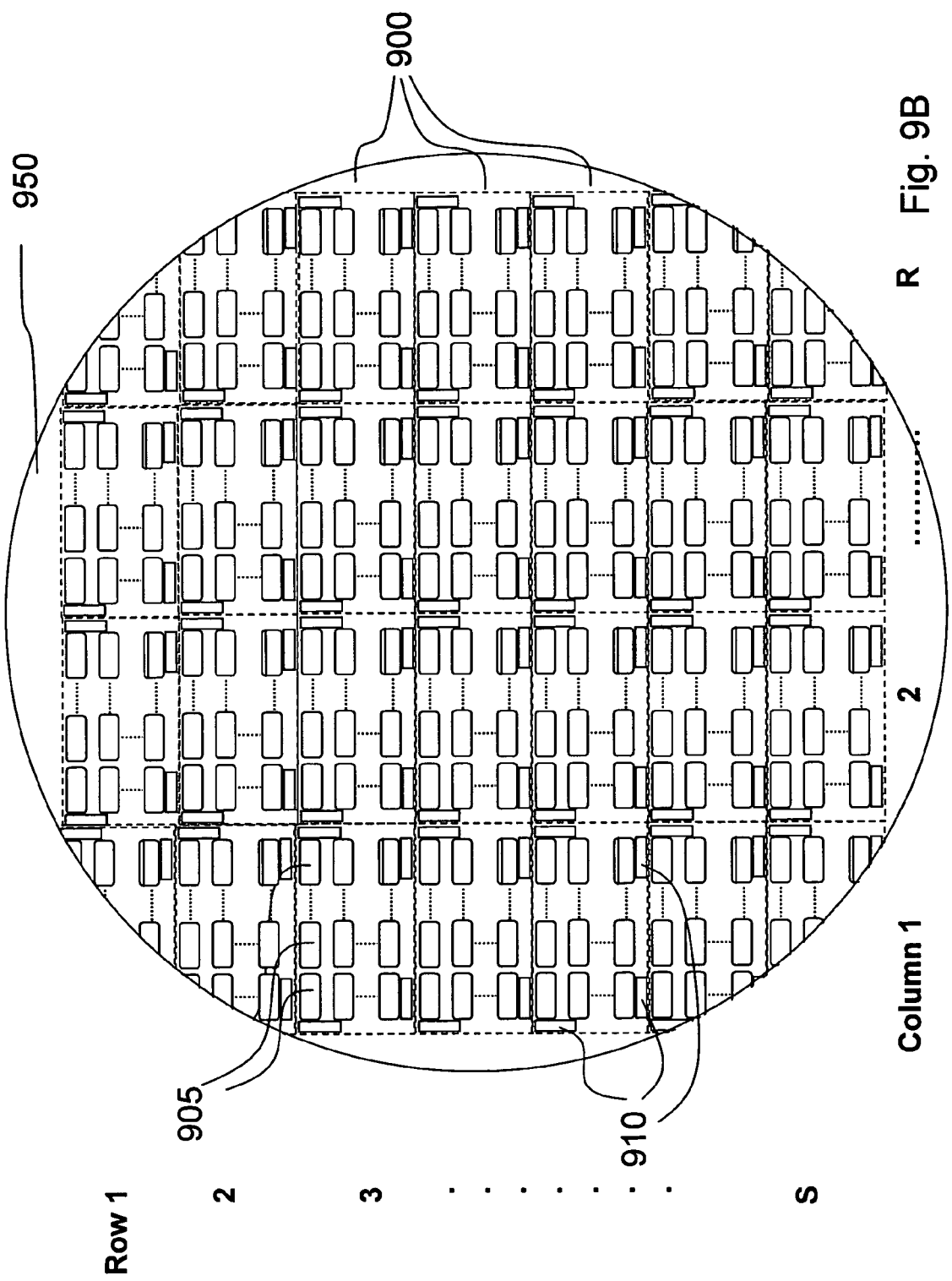
Referring to FIG. 9C shown is an exemplary layout of a semiconductor wafer wherein the exemplary reticle block of FIG. 9A is replicated across the wafer, and the wafer now includes foundry elemental test patterns in restricted regions.

Referring to FIG. 9B shown is an exemplary layout of a semiconductor wafer wherein the exemplary reticle block 900 of FIG. 9A is replicated across the wafer 950. The reticle block then replicated into a matrix of R columns and S rows. Within each fully replicated reticle block 900 is the N×M matrix of device cells 905 and the additional test structures 910. Within each device cell 905 is the elemental test block 915 (not shown for clarity).

The elemental device parameter measurement and calibration data storage are performed at the wafer level, either by the designer or if the relationship is sufficiently strong by the foundry manufacturer for the designer. Taking the approach outlined in the first embodiment in FIG. 3 the elemental device parameters is measured for each of the individual test cells 905 within the wafer map of lithographically replicated R×S reticle blocks 900, each reticle blocking being a lithographically printed maximum of N×M device cells 905.

Using this approach every fully lithographically printed device cell 905 is calibrated and the results stored. However, it will be evident to one skilled in the art that for some designs the values of N×M are extremely large, for example 10 Gb/s transimpedance amplifiers (TIA) at die level have footprints of ~0.6×1.2 mm giving over 300 die per 15×15 mm reticle block, and die counts per wafer exceeding 8,000 per 100 mm wafer. In these cases local calibration data for closely spaced 10 Gb/s TIA are very similar or if the foundry processes are very well controlled nearly identical. Therefore, per die testing is not always financially beneficial and it is appropriate to consider a per block testing. Hence, the additional test structures 910 are used to provide localized control setting data and thence calibration data. If the structure as shown in FIG. 9 were employed then the testing of 4 test structures 910 provides a two-dimensional mapping of the appropriate control setting for the reticle block 900.

Many alternative embodiments of the placement of test structures, reticle blocks and elemental test cells are supported without departing from the spirit of the invention.

Figure 9C:
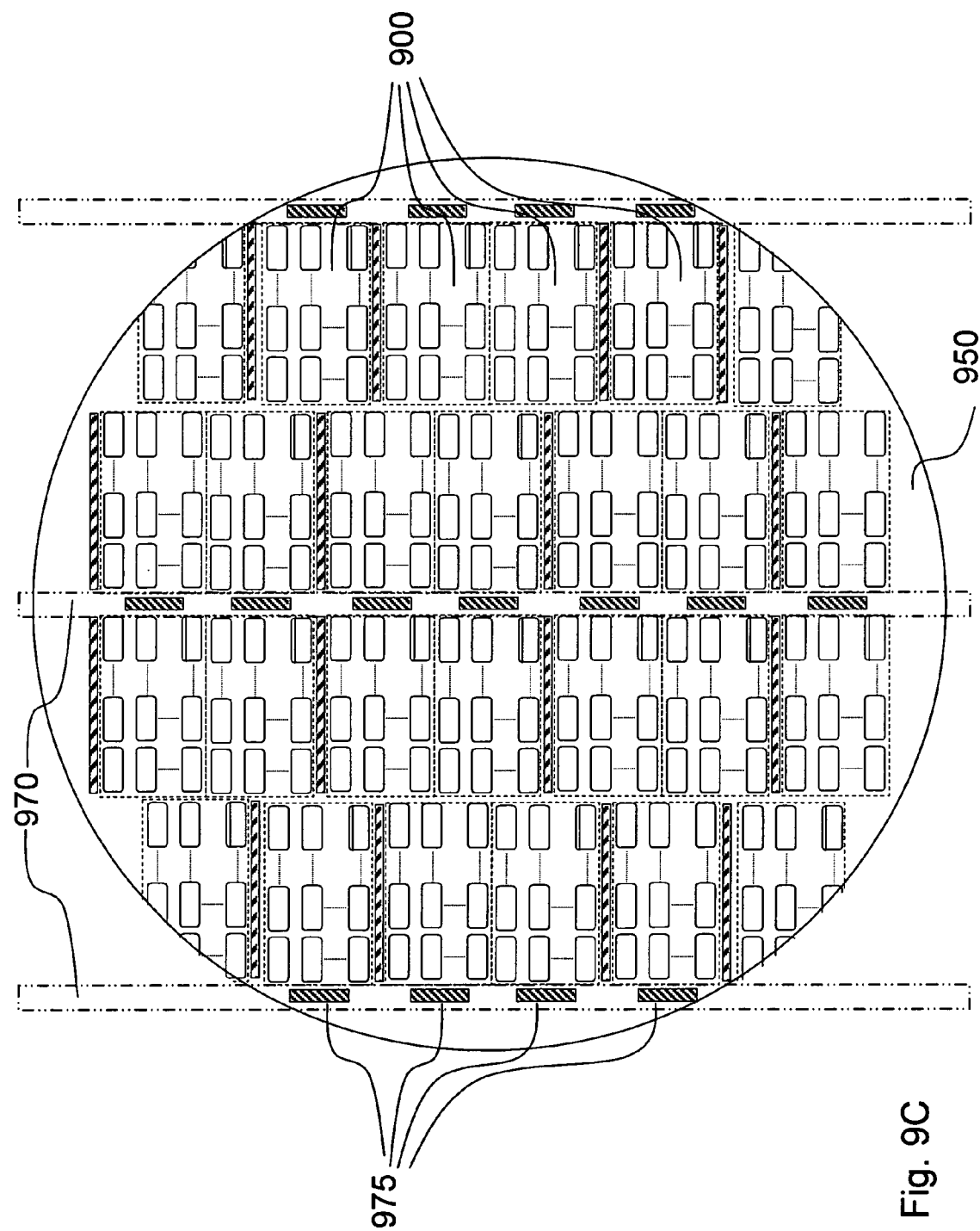

Within semiconductor manufacturing facilities operating as foundries the supplier of processed wafers is paid on each wafer within specification, and not based upon the performance of a customer's design. As a result the foundry generally identifies portions of the wafer 950 that are unavailable to the designer. Such a layout is shown in FIG. 9C wherein the foundry has specified three foundry only regions 970 as out-of-limits to the designer. The designer has now mapped their reticle blocks 900 into the resulting map, each of the reticle blocks again comprising N×M device cells 905.

Within each of the foundry only regions 970 a series of foundry test patterns 975 is disposed. These are manufactured in the same process sequence as the actual devices but are to the foundries own design and totally decoupled from that of the designer accessing the foundry. As such the foundry has components to define whether a wafer has passed or failed the acceptance criteria established between the foundry and the designer.

The foundry in measuring results of the foundry test patterns 705 to verify compliance of the wafer is generally also measuring elemental devices to achieve the manufacturing compliance parameters such as resistance, capacitance, inductance, gate voltage, dark current etc. Therefore, provided the software analysis, look-up tables etc used to derive the control signal requirements of the devices 905 accept this elemental device data, as opposed to the elemental device data extracted from elemental test blocks inserted into the reticle, the method is alternatively applicable with data measured during wafer manufacture.

Figure 10A:
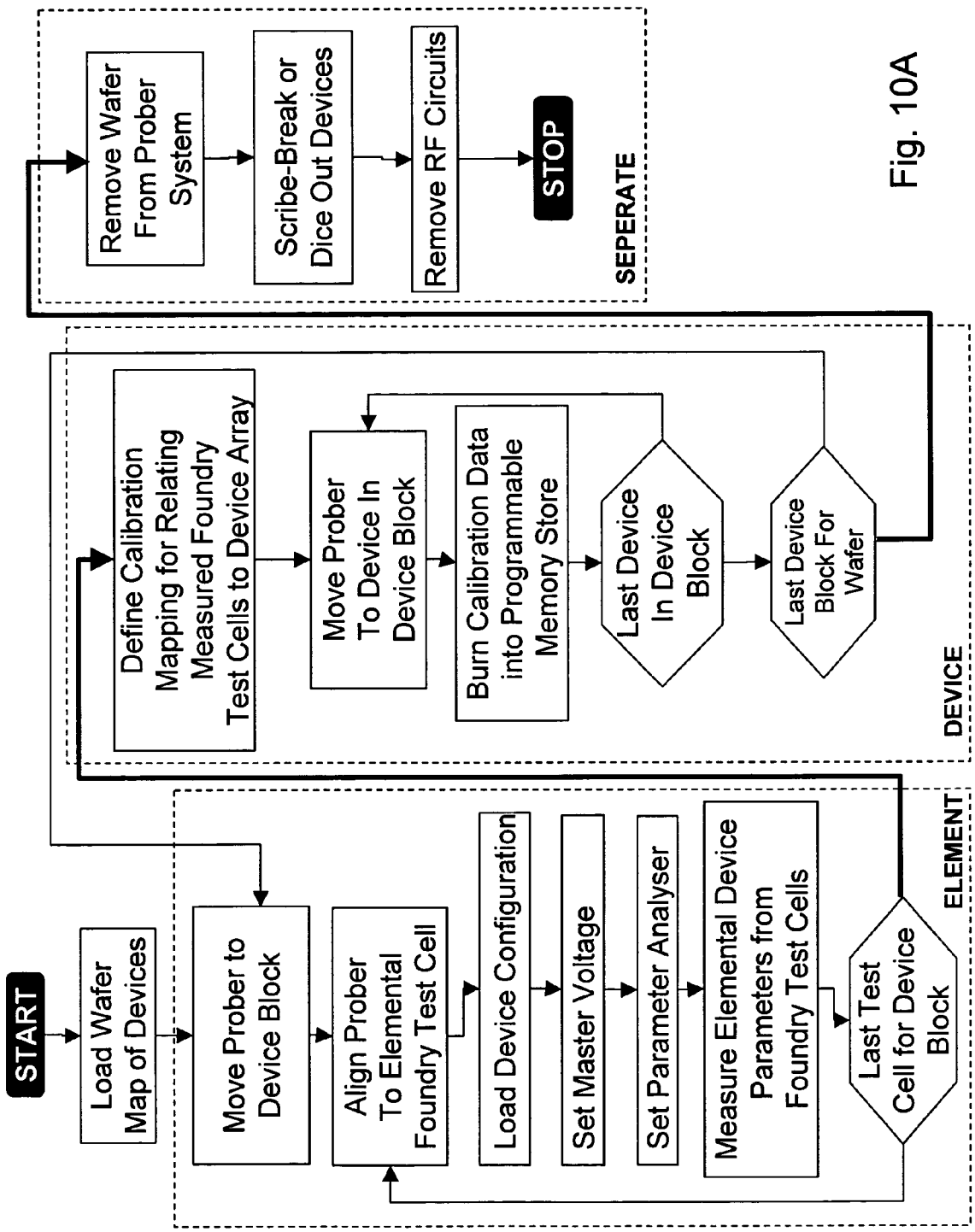
FIG. 10A is an exemplary flow diagram for the application of an embodiment of the invention wherein the embodiment described in FIG. 9B is employed.

FIG. 10 is an exemplary flow diagram for the application of an embodiment of the invention wherein the embodiment described in FIG. 9B is employed. As such the flow diagram comprises three steps, ELEMENT, DEVICE, and SEPERATE. In the first ELEMENT the wafer upon a probing station is robotically moved such that the prober accesses the reticle test blocks, measures the elemental device parameters for the block, and then moves, tests in a loop until all reticle test blocks for one of the arrayed reticle blocks is completed. In the second step, DEVICE, the resulting elemental device results are used to generate a mapping of the control signal requirements for the N×M devices within the reticle block. Then the prober moves the wafer accessing each individual cell within the reticle block and stores appropriate calibration data into the programmable memory store.

As shown in the flow diagram, upon completing this the prober moves to the next reticle block and repeats the sequence. After completing all reticle blocks and storing all calibration data the wafer is removed from the prober and within SEPARATE the wafer is converted to the individual die, typically via laser cutting, scribe-and-break, and dicing.

DC parameter test equipment required to undertake ELEMENT is idle during the DEVICE stages. As such according to cost, time, and other resource constraints, other embodiments of the process flow are possible, such as performing all reticle block elemental device measurements on the wafer before removing it from that workstation and transferring it to another, which performs the programming of all devices.

Figure 10B:
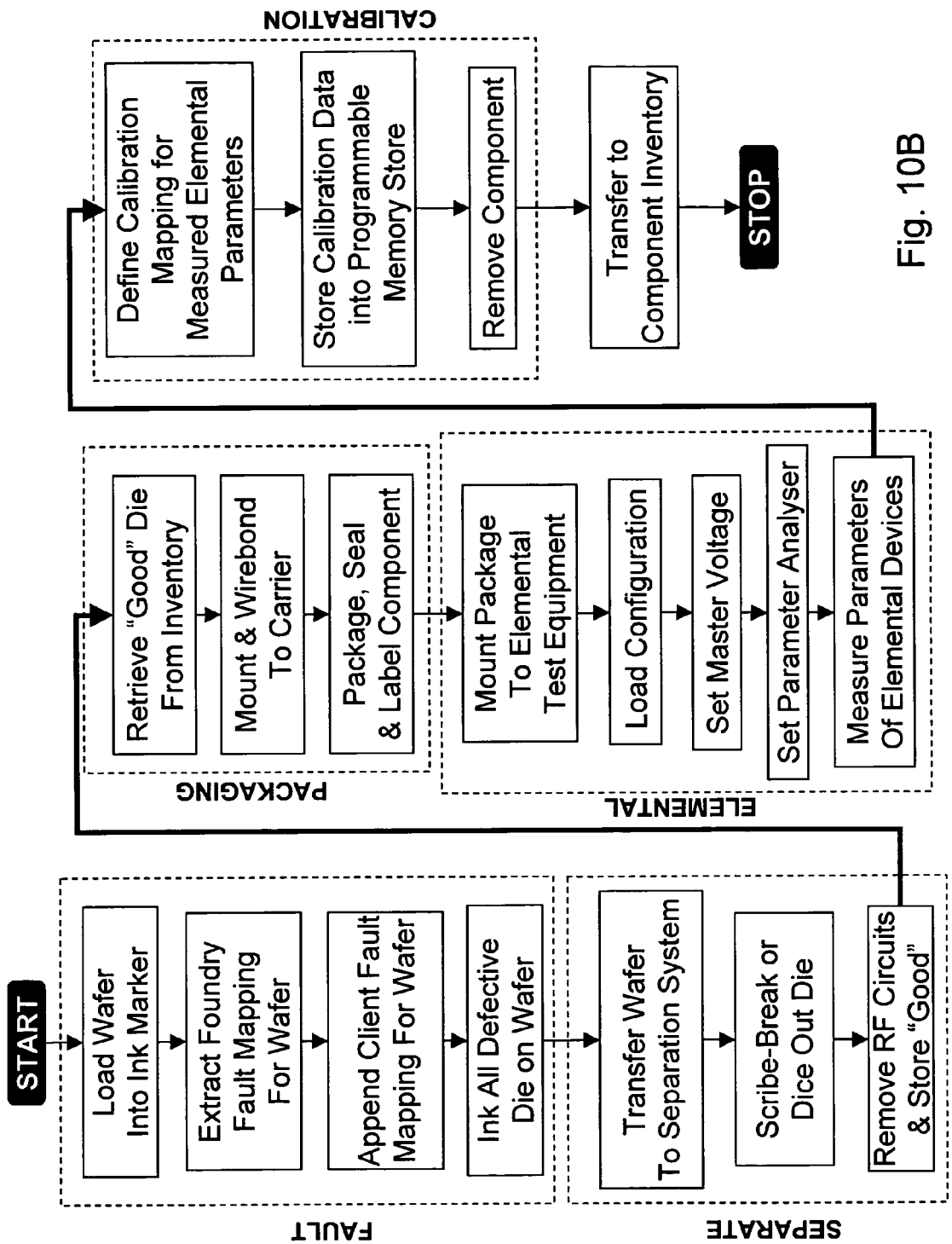
FIG. 10B is an exemplary flow diagram for another embodiment of the invention wherein after die separation the die are packaged and sealed prior to elemental device measurements and storage of the calibration data.

FIG. 10B is an exemplary flow diagram for another method of producing semiconductor components separated die are packaged and sealed prior to elemental device measurements and storage of the calibration data.

As such the flow diagram consists of five steps, FAULT, SEPARATE, PACKAGING, ELEMENTAL, and CALIBRATION. In this exemplary and simplified flow diagram the FAULT step comprises firstly of loading the semiconductor wafer of die into an inking system. A software wafer map from the foundry manufacturing the wafer is loaded and is appended to a client fault mapping of the wafer. The client wafer map is optionally generated from a variety of processes including a visual inspection, a DC probing of test structures, a probing of a circuit element, and linewidth measurements of the foundry test structures. Using the combined wafer map the "defective die" on the wafer are inked for clear visual distinction at later stages.

The wafer then proceeds to the SEPARATE process wherein using, for example, scribe-break, dicing or laser cutting techniques the individual die are separated from the wafer. Then using either manual, automated or semi-automated techniques the "good" die are separated from the system and placed into die inventory for storage and subsequent assembly or sale. In the embodiment shown the next step is PACKAGING wherein a "good" die is retrieved from inventory and is packaged using the appropriate techniques to mount, bond, encapsulate and seal the packaged component.

After being packaged the component now moves to the ELEMENTAL process step. Here the component is loaded onto a high-speed automatic test station, which loads the component configuration, sets the master voltage, and then using a parameter analyzer performs a measurement of the elemental device values. Optionally at this point devices are screened based upon elemental device test results such as results outside of pre-determined values or other client defined criteria.

The final process step is calibration, where the extracted elemental device parameters for the component are used within the client's software model to define the calibration data for the component. This is then programmed into a programmable memory store of the component. The component is removed and placed into component inventory. It is evident to one skilled in the art that other that alternative processes, combinations of processes and flows through the processes exist leading a same or similar result of calibration stored burnt in or in association with the programmable memory store.

Figure 11:
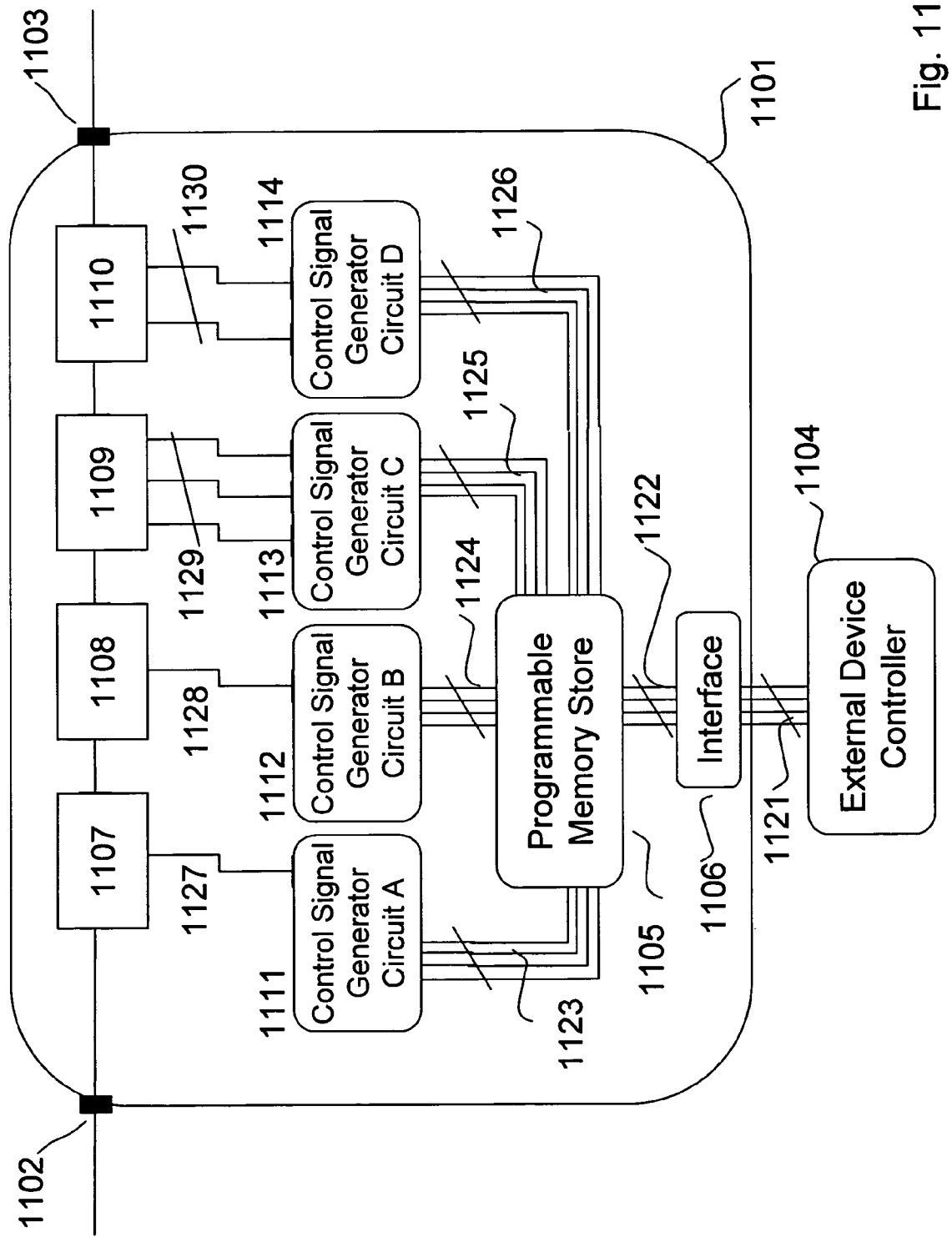
FIG. 11 illustrates an embodiment of the invention wherein the programmable memory store distributes the digital control setting to multiple bias control circuits, each addressing different elements of the integrated circuit, wherein the digital control setting employed is selected from the programmable memory store by an external controller addressing the memory store.

FIG. 11 illustrates an embodiment of the invention wherein the programmable memory store distributes the digital control setting to multiple bias control circuits, each addressing different elements of the integrated circuit, wherein the digital control setting employed is selected from the programmable memory store by an external controller addressing the memory store.

In FIG. 11, the microwave circuit 1101 is in the form of an RF integrated circuit comprising four microwave circuit blocks, denoted by circuits 1107-1110. The microwave circuit 1101 is electrically coupled to the preceding microwave devices (not shown), which provide an RF input signal to the RF input port 1102. The microwave circuit elements, 1107-1110 are sequentially electrically coupled to manipulate and process the RF input signal, therein providing an RF output signal at the RF port 1103 for feeding forward to subsequent microwave circuitry (not shown).

Each of the microwave circuit elements 1107-1110 is coupled to a control signal generator circuit 1111-1114. Therefore, circuit element 1107 is electrically coupled to control signal generator circuit 1111. Similarly circuit elements 1108, 1109 and 1110 are electrically coupled to signal generator circuits 1112, 1113, and 1114 respectively. As shown circuit elements 1107 and 1108 have single control signals, 1127 and 1128 respectively, applied to them from the control signal generator circuits 1111 and 1112.

In contrast circuit element 1109 receives three control signals 1129 from control signal generator circuit 1113. Finally, circuit element 1110 receives two control signals 1120 from control signal generator circuit 1114.

The actual control signals applied to the multiple circuit elements 1107-1110 of the microwave circuit 1101 from the control signal generator circuits 1111-1114 are determined by the digital set point control data provided to these circuits from the programmable memory store 1105. Each control signal generator circuits 1111-1114 is electrically coupled to the programmable memory store 1105 via data lines 1123-1126.

Also shown externally electrically coupled to the microwave circuit 1101 is an external device controller 1104. The external device controller 1104 is interfaced to the programmable memory store 1105 by an interface 1106. In the embodiment shown the programmable memory store 1105 contains a plurality of digital setpoint control data values, which represent different overall operating characteristics of the microwave circuit 1101. Communication of a digital control word from the external device controller 1104 over the external data bus 1121 to the interface 1106 results in the digital word addressed to the programmable memory store 1105 via an internal data bus 1122.

Upon receipt of the new digital control word the programmable memory store 1105 extracts the appropriate digital set point control data and places this onto the internal data lines 1123-1126 connecting to the control circuit generator circuits 1111-1114.

This new digital set point control data results in the control circuit generator circuits 1111-1114 providing different bias control signals 1127-1130 to the microwave circuit elements 1107-1110. As a result the operation of the microwave circuit 1101 is changed according to the predetermined performance response at the test and characterization stage of manufacturing.

Figure 12:
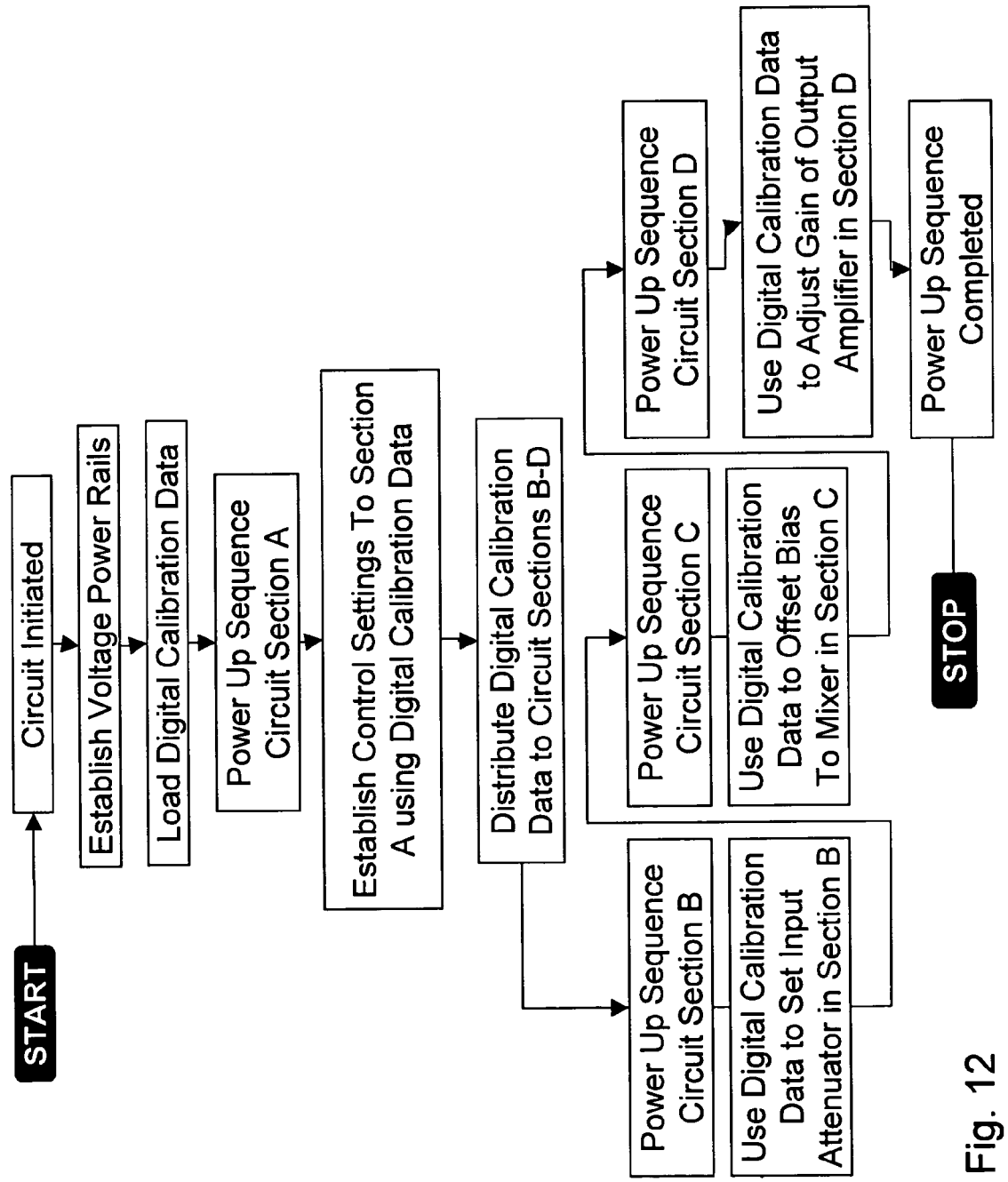
FIG. 12 illustrates an exemplary flow chart for the initiation of a microwave circuit wherein the control settings of the active microwave circuit are digitally stored within a programmable memory store which forms part of the microwave circuit and are communicated to multiple sections of the circuit when initiated into a microwave system.

FIG. 12 illustrates an exemplary flow chart for the initiation of a microwave circuit wherein the control settings of the active microwave circuit are digitally stored within a programmable memory store which forms part of the microwave circuit and are communicated to multiple sections of the circuit when initiated into a microwave system.

In this exemplary flow diagram when the overall microwave system is powered up the voltage power rails are firstly established powering each internal circuit element. Then the digital calibration data is loaded from the programmable memory store. Such programmable memory store is optionally a one-time programmable memory device or a reprogrammable memory store depending upon the microwave system and device within which the circuit is operating.

After extracting the digital calibration data, a first circuit portion A of the microwave circuit is initiated and the control settings of the first circuit portion A are established. Next in this exemplary flow diagram the digital calibration data is communicated to a second circuit portion B and used to define the control settings of an input attenuator, which forms part of the second circuit portion B.

Then in sequence, the digital calibration data is communicated to a third circuit portion C and used to define the control settings of a microwave mixer which forms part of the second circuit portion C. Finally the digital calibration data is communicated to a fourth circuit portion D and used to define the control settings for the gain of an output amplifier which forms part of the second circuit portion D.

At this point the power up sequence is completed and the microwave circuit operates with an approximately optimal setting against the design requirements without the need for additional production stages to establish this performance within the overall microwave circuit.

Figure 13:
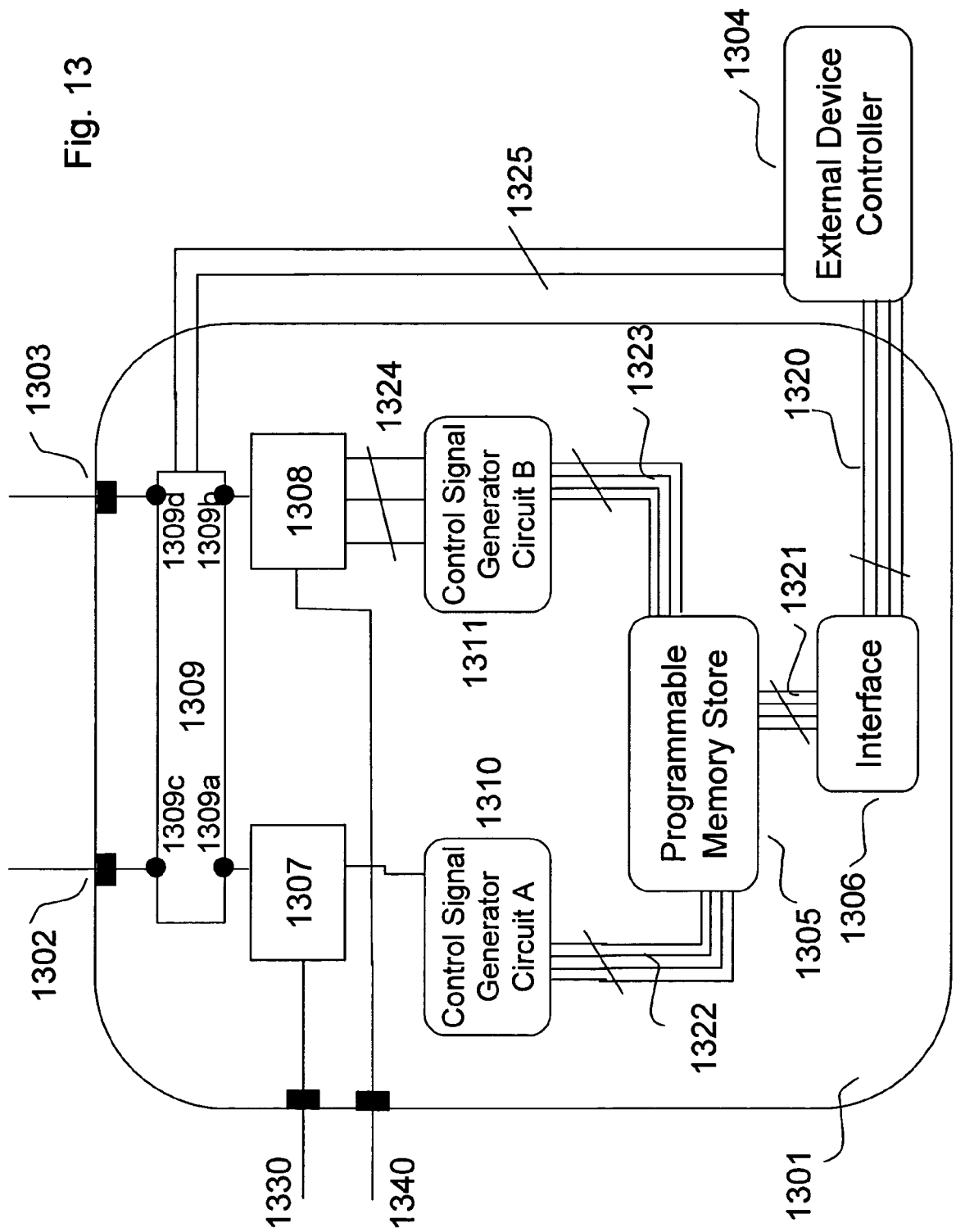
FIG. 13 illustrates an embodiment of the invention wherein the testing and calibration of the integrated circuit is performed by configuring a loop-back test configuration of the integrated circuit using a switching element within the integrated circuit.

FIG. 13 illustrates an embodiment of the invention wherein the testing and calibration of the integrated circuit is performed by configuring a loop-back test configuration of the integrated circuit using a switching element within the integrated circuit. Such an embodiment is applicable to a subset of the microwave circuits which when powered generate microwave signals and hence this subset of devices does not necessarily require the addition of any test circuits to characterize it.

Referring to FIG. 13 there is shown a microwave circuit 1301 which has an RF output port 1302 electrically coupled to subsequent RF circuitry (not shown) and an RF input port 1303 which receives an RF signal from preceding RF circuitry (not shown). Additionally coupled to the microwave circuit is an external device controller 1304.

Within the microwave circuit 1301 are a microwave transmitter circuit 1307 and a microwave receiver circuit 1308. The microwave transmitter circuit 1307 is electrically coupled to the RF output port 1302 via a microwave switch 1309. Similarly the microwave receiver circuit 1308 is electrically coupled to the RF input port 1301 via the microwave switch 1309. The microwave switch 1309 operates in two states. In a first state, the THRU state, the input ports 1309a and 1309b are electrically coupled to the output ports of the switch 1309c and 1309d respectively. The microwave switch also having a second state, a LOOP state, wherein the input ports 1309a and 1309b are electrically coupled therein providing a loop-back from the microwave transmitter 1307 to the microwave receiver 1308. Optionally the microwave switch 1309 includes additional microwave elements such as attenuators to prevent overloading of the receiver circuit 1308.

The microwave transmitter 1307 is electrically coupled to a control signal generator circuit 1310 and a microwave signal input port 1330. The control signal generator circuit is provided with control data signals 1322 from the programmable memory store 1305. Similarly the microwave receiver 1308 is electrically coupled to a control signal generator circuit 1311 with data lines 1324, and a microwave signal output port 1340. The control signal generator circuit 1311 is provided with control data signals 1323 from the programmable memory store 1305. In this manner the overall performance of the microwave circuit 1301 is defined by the control data signal stored within the programmable memory store 1305 as calibration data.

Also electrically coupled to the microwave circuit 1301 and the microwave switch 1309 is an external device controller 1304. This communicates to the microwave circuit 1301 via an interface 1306 and digital communications 1320 and 1321. The communication to the microwave switch is via communication lines 1325. In this manner the external device controller issues a command over the communication lines 1325 to take the microwave switch 1309 from a THRU state to the LOOP state such that now the receiver 1308 is receiving the transmitted signal from transmitter 1307. As such, in this embodiment, the external controller derives the performance of the microwave circuit and determines whether the current operation mode of the microwave circuit 1301 is appropriate. Should the external device controller 1304 determine that the operation mode is not optimal then it places the microwave circuit into another predefined state of operation. Alternatively, it only changes the state of operation upon known criteria. To initiate this change, the external device controller 1304 communicates via the interface 1306 to the programmable memory store 1305. This causes the programmable memory store 1305 to extract a new digital control data word from memory and place this onto the internal data lines 1322 and 523. As a result the control signal generator circuits 1310 and 1311 provide different bias control signals to the transmitter 1307 and receiver 1308 therein changing the overall performance of the microwave circuit.

Optionally, the LOOP state is used in the actual test and calibration stages of the manufacturing line for the microwave circuit 1301.

Figure 14:
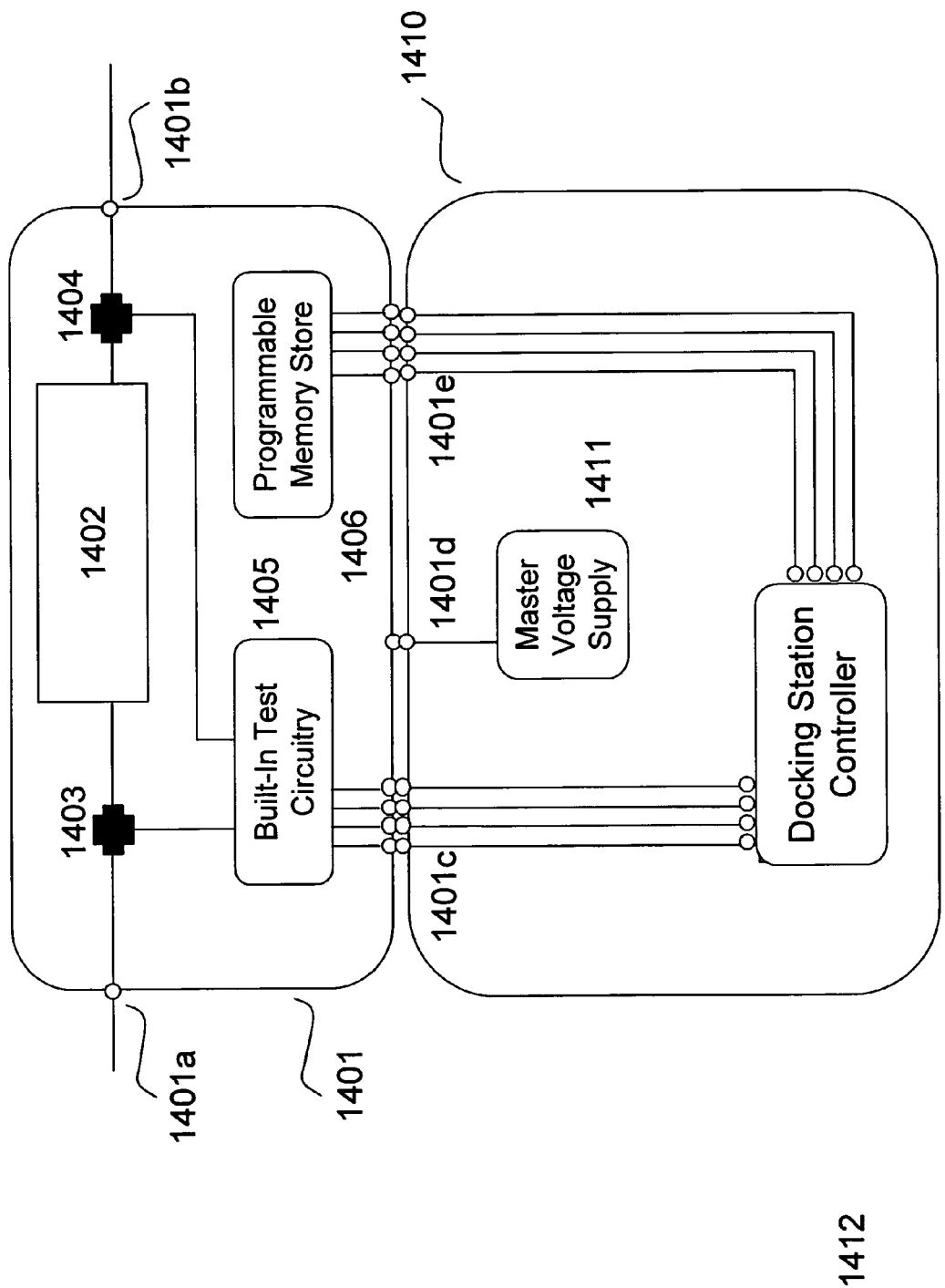
FIG. 14 illustrates an embodiment of the invention wherein the integrated circuit calibration is periodically repeated upon the insertion of a device incorporating the integrated circuit into a docking station.

FIG. 14 illustrates an embodiment of the invention wherein the integrated circuit calibration is periodically repeated upon the insertion of a device incorporating the integrated circuit into a docking station.

Shown are a portable device 1401, comprising microwave circuit 1402, and a docking station 1410. The portable device 1401 as shown comprises an RF input port 1401a and an RF input port 1401b, which are electrically coupled to each other via a first microwave switch 1403, microwave circuit 1402, and a second microwave switch 1404. The performance of the microwave circuit 1402 is established via the data extracted from the programmable memory store 1406. Finally the portable device 1401 comprises a built-in test circuit 1405, which is electrically coupled to the microwave switch 1403 and second microwave switch 1404.

Upon connecting the portable device 1401 to its docking station 1410 electrical connections 1401c, 1401d and 1401e are made and detected by the docking station controller 1412. Connection 1401c connects the built-in test circuit 1405 with the docking station controller, connection 1401d connecting the master voltage supply 1411 to the portable device 1401 and, connection 1401d connects the programmable memory store 1406 with the docking station controller 1412.

When docked, the master voltage supply 1411 is electrically coupled to the microwave circuit 1402, and the internal portable device power supply applied to the microwave circuit 1402 (not shown) is disconnected. In this manner the microwave circuit is established at a well-defined voltage, as it was during the manufacturing process on the production testing stations.

The docking station controller 1412 now issues commands to the built-in test circuitry, which in this embodiment causes the switching of the first microwave switch and second microwave switch 1404 such that the microwave circuit is now electrically coupled to the built-in test circuitry and isolated from the RF input port 1401a and RF output port 1401b. In this manner the microwave circuit is now powered from the master voltage supply 1411 and tested with the built-in test circuitry 1405. Therefore, in this embodiment, upon redocking the portable device 1401 to the docking station 1410 the microwave circuit is re-characterized and new digital calibration data stored within the programmable memory store.

Figure 15:
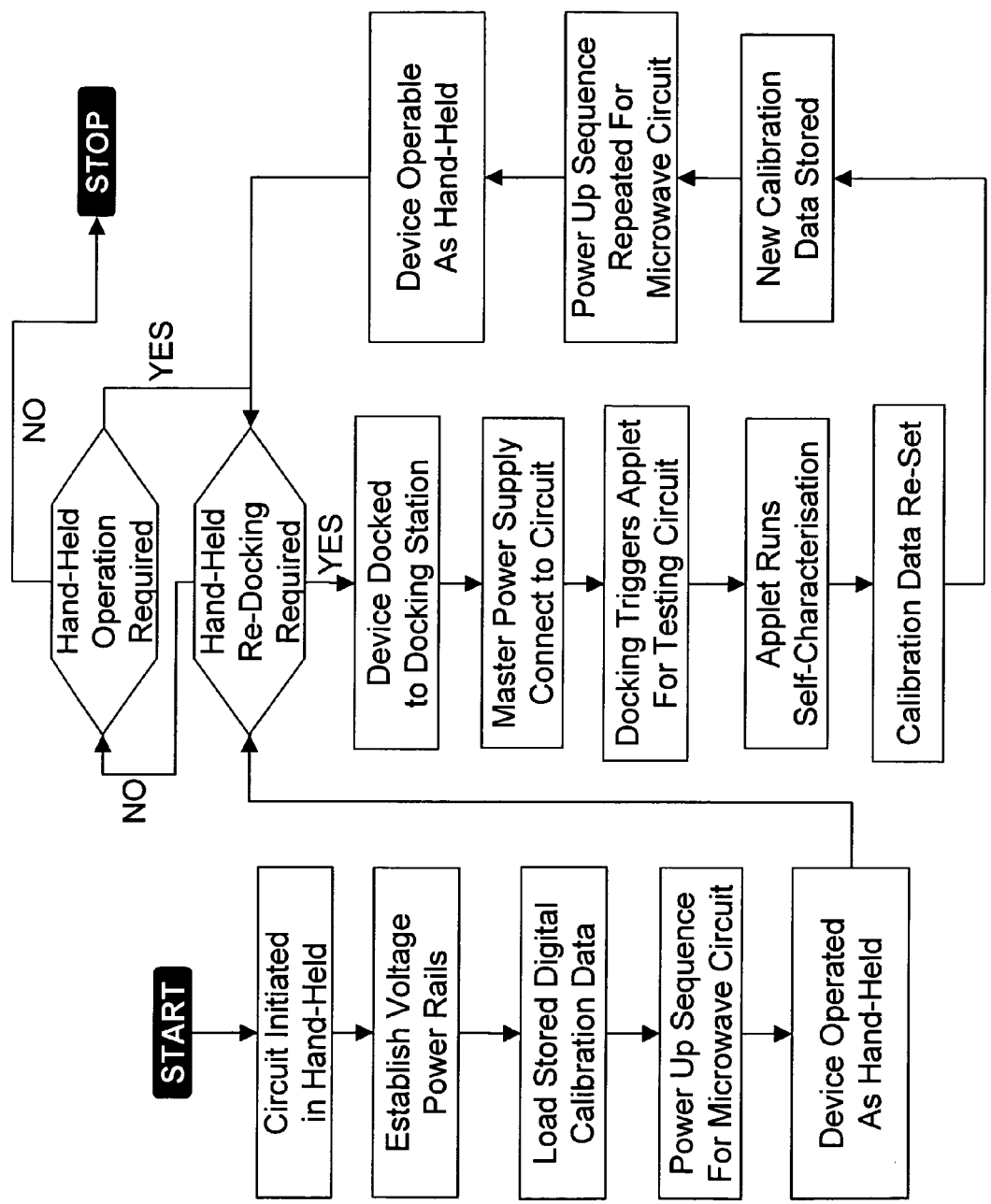
FIG. 15 illustrates an exemplary flow diagram for a microwave circuit that is part of a handheld device wherein the digitally stored control settings of the microwave circuit are optionally periodically updated when the device containing the microwave circuit is docked back with a docking station.

FIG. 15 illustrates an exemplary flow diagram for a microwave circuit that is part of a handheld device wherein the digitally stored control settings of the microwave circuit are periodically updated when the device containing the microwave circuit is docked with a docking station.

In the present embodiment, the device incorporating the microwave circuit is a handheld device, which also has a docking station to which the handheld device can be interfaced. Non-limiting examples of such devices include cellular telephones, personal data assistants, and global positional systems (GPS).

When powered up the microwave circuit is initiated, the voltage power rails are established and the digital calibration data are loaded. The power up sequence of the microwave circuit is then executed and the approximately optimum settings of the microwave circuit established using the digital calibration data. The device is then operated by a user as a handheld device performing its designed functions to the approximately optimum level of performance for the microwave circuit.

Subsequently, a user returns the device to its docking station. In doing so a master power supply from the docking station is coupled to the device. Said master power supply from the docking station having been designed for improved stability when compared to that provided from the batteries of the handheld device. Said master power supply is generally comparable in magnitude and stability to that provided at the original manufacturing test station. Alternatively, said master power supply is within known limits of the original master power supply of the manufacturing test station.

Docking now triggers loading of an applet for testing and assessing the microwave circuit. Once loaded the applet executes and performs a self-characterization of the microwave circuit. For example, when the circuit forms part of a cellular telephone then a reference microwave source and microwave receiver are already present within the device and hence essentially provide a self-contained test instrument if there is provided a switchable connection between the transmit and receive portions of the microwave circuit, said switchable element controlled by the applet loaded when the device was docked with the docking station.

Upon completion of the self-characterization the applet then defines a new approximately optimum set of control settings, which is then stored within the programmable memory storage device forming part of the microwave circuit.

Though in the above described embodiments, the characterization is performed in order to determine an approximately ideal or optimal control setting, alternatively, the set of control settings is other than approximately optimum.

Numerous other embodiments can be envisaged without departing from the spirit or scope of the invention.

What is claimed is:

1. A method comprising:
   (a) providing an integrated circuit for performing a first circuit function and responsive to a control signal to support a first operating characteristic;
   (b) providing at least one elemental device;
   (c) providing a known current or voltage to the at least one elemental device;
   (d) measuring one or more elemental device parameters of the at least one elemental device while the known current or voltage is applied thereto;
   (e) determining data for, when stored within a memory store and utilized by a control signal generating circuit, resulting in obtaining a first control signal for application as approximately the control signal; and,
   (f) storing the data within the memory store.

2. The method according to claim 1 wherein the known current or voltage is within or equal to specified operating limits of the integrated circuit.

3. The method according to claim 1 wherein the known current or voltage is outside specified operating limits of the integrated circuit.

4. The method according to claim 1 wherein the at least one elemental device is integrated within a same substrate as the integrated circuit and other than forms a partial circuit of the integrated circuit.

5. The method according to claim 1 wherein the at least one elemental device is integrated within the integrated circuit and forms a partial circuit of the integrated circuit.

6. The method according to claim 1 wherein the at least one elemental device comprises at least a resistor, capacitor, inductor, and transistor.

7. The method according to claim 1 comprising providing the memory store integrated within the integrated circuit.

8. The method according to claim 1 comprising performing (d) by coupling with ports only coupled to the at least one elemental device.

9. The method according to claim 1 comprising performing (d) by multiplexed access to the at least one elemental device via input ports of the integrated circuit.

10. The method according to claim 1 wherein the at least one elemental device comprises an elemental device of a manufacturer of the integrated circuit for use by the manufacturer in testing of an integrated circuit manufacturing process.

11. The method according to claim 1 further comprising packaging the integrated circuit prior to (c).

12. The method according to claim 1 further comprising performing at least (c) and (d) while the integrated circuit is integrated within a wafer.

13. The method according to claim 1 further comprising mapping the stored data in dependence upon a predetermined mapping to obtain the first control signal.

14. The method according to claim 13 wherein the control signal is an operating point signal for changing operating characteristics of the integrated circuit.

15. The method according to claim 1 wherein the determining data is performed in dependence upon a mapping of the measured one or more elemental device parameters to obtain the data.

16. The method according to claim 1 further comprising comparing the measured one or more elemental device parameters against nominal values specified by a process technology to determine the data to be stored.

17. The method according to claim 16 comprising storing difference value between measured and nominal values within the memory store.

18. The method according to claim 1 further comprising:
providing the stored difference value to the control signal generating circuit;
testing a resulting characteristic of first circuit function; and
comparing the resulting characteristic with a target predetermined range of characteristic to determine whether said resulting operating characteristic is within said target predetermined range 19. The method according to claim 18 comprising:
adjusting the first control signal in a first manner when determination of the resulting characteristic is outside said target predetermined range; and
adjusting the first control signal in second other manner when determination of the resulting characteristic is inside said target predetermined range.

20. The method according to claim 18 wherein the testing is performed using a test circuit integrated within the integrated circuit.

21. The method according to claim 18 comprising:
a switch for switching of the integrated circuit between a first mode of operation and a second mode of operation wherein the integrated circuit has a loop-back configuration such that the integrated circuit in the second mode of operation provides a test configuration.

22. The method according to claim 1 wherein the known current or voltage is provided from test circuitry external to the integrated circuit, to an input port of the integrated circuit.

23. method according to claim 1 wherein the known current or voltage is provided to an input port of the integrated circuit after said integrated circuit is packaged.

24. The method according to claim 1 wherein the integrated circuit comprises a plurality of circuit stages each having at least one input port electrically coupled for receiving a control signal, the method comprising:
providing the control signal to two circuit stages, each of the two circuit stages receiving a different control signal generated by a different control signal generating circuit.

25. The method according to claim 24 wherein the control signal is a bias voltage.

26. The method according to claim 24 wherein the control signal is an operating point signal for changing operating characteristics of the circuit stages to which it is electrically coupled.

27. The method according to claim 26 wherein a plurality of control signals are provided to at least one of the circuit stages.

28. The method according to claim 27 wherein at least two of the plurality of control signals are electrically coupled to the same element of the one of the circuit stages.

29. The method according to claim 24 wherein the control signal for some circuit stages is provided in dependence upon a same data within the memory store.

30. The method according to claim 24 wherein the control signal for some circuit stages is provided in dependence upon different data within the memory store.

31. The method according to claim 1 wherein the stored data is indicative of one of a plurality of predetermined first control signals, different stored data resulting in different ones of the plurality of predetermined first control signals, each first control signal supporting a different first operating characteristic of the integrated circuit.

32. The method according to claim 31 comprising:
providing second digital data; and,
selecting one of the plurality of first control signals and operating characteristics of the integrated circuit based upon the second digital data.

33. The method according to claim 1 wherein the first control signal remains fixed over time in response to the data remaining fixed.

34. The method according to claim 1 wherein the data is digital data.

35. The method according to claim 1 wherein the data relates to establishing the control signal.

36. The method according to claim 1 wherein the memory store is a non-volatile memory store.

37. The method according to claim 36 wherein the non-volatile memory store comprises fuses.

38. The method according to claim 1 wherein the first operating characteristic is analog.

39. The method according to claim 1 wherein the integrated circuit is an radio frequency (RF) circuit.

40. The method according to claim 1 wherein the integrated circuit is a high-speed digital circuit.

41. The method according to claim 40 wherein one of the elemental device parameters is a threshold voltage.

42. The method according to claim 1 wherein the control signal results in a switching circuit latching to one of a plurality of switching configurations.

43. The method according to claim 1 wherein (c), (d), (e) and (f) are performed at intervals.

44. The method according to claim 43 comprising:
providing a docking station;
coupling of a device comprising the integrated circuit and at least one elemental device with the docking station; and
providing a signal for initiating (c), (d), (e) and (f).

45. The method according to claim 44 wherein the known current or voltage is provided from circuitry within the docking station.

46. The method according to claim 43 wherein the data store comprises a re-writable data store.

47. An apparatus comprising:
an integrated circuit comprising:
a programmable memory store for storing of calibration data;
a control circuit for providing at least a first analog control signal in response to the calibration data, the at least a first analog control signal is different for different calibration data stored within The programmable memory store; and,
a first circuit for performing a first circuit function having a performance responsive to the at least a first analog control signal, the performance of the first circuit function is different in response to different at least a first analog control signal, the calibration data determined in response to providing a known voltage or current to at least one elemental device and measuring a characteristic of the at least one elemental device and for providing the first analog control signal from the control circuit and providing approximately a predetermined performance of the first circuit.

48. The apparatus according to claim 47 wherein, when in use, the calibration data is for approximately providing The at least a first analog control signal by the control circuit.

49. The apparatus according to claim 47 wherein the at least a first analog control signal comprises a bias control signal.

50. The apparatus according to claim 47 wherein the first circuit comprises:
a plurality of circuit stages each having at least one input port electrically coupled for receiving a control signal, and
wherein the control circuit comprises a plurality of different control signal generating circuits,
wherein, when in use, a control signal is provided to some of the plurality of circuit stages, each of the some of the plurality of circuit stages receiving a different control signal generated by one of the plurality of different control signal generating circuits.

51. The apparatus according to claim 50 wherein at least two of the plurality of control signals are electrically coupled to the same element of one of the some of the plurality of circuit stages.

52. The apparatus according to claim 50 wherein each of the plurality of input ports electrically coupled to a circuit stage of the plurality of circuit stages is for receiving a signal for adjusting a different element of the circuit stage.

53. The apparatus according to claim 47 wherein the stored calibration data is indicative of one of a plurality of predetermined first control signals, different stored data for resulting in different ones of the plurality of predetermined first control signals, each first control signal for supporting different first operating characteristics of the first circuit.

54. The apparatus according to claim 47 wherein a difference in at least two of a plurality of analog control signals is based on a second digital word stored within the programmable memory store.

55. The apparatus according to claim 47 wherein the first circuit comprises a discrete component.

56. The apparatus according to claim 47 wherein the programmable memory store is a one-time programmable read only data memory store.

57. The apparatus according to claim 47 comprising a digital to analog converter and wherein, when in use, the first analog control signal is derived directly from the calibration data by using the digital to analog converter.

58. The apparatus according to claim 47 wherein the first circuit comprises an RF circuit.

59. The apparatus according to claim 47 wherein a operating characteristic of the first circuit function is analog.

60. The apparatus according to claim 47 wherein the first circuit comprises a high-speed digital circuit.

61. The apparatus according to claim 47 wherein the at least one elemental device is disposed within the apparatus.

62. The apparatus according to claim 61 comprising a test input port for supplying a known applied current or voltage to the at least one elemental device, the test input port other than accessible when the first circuit is packaged.

63. The apparatus according to claim 61 comprising a test circuit integrated with the integrated circuit for measuring a characteristic of the at least one elemental device and for determining the calibration data for resulting in the first analog control signal for resulting in approximately a predetermined operating characteristic and for storing within the programmable memory store; the determined calibration data for resulting in approximately the determined first analog control signal.

64. The apparatus according to claim 63 wherein the test circuit further comprises circuitry for providing a reference current or voltage to the at least one elemental device.

65. The apparatus according to claim 63 wherein the test circuit further comprises a timer for repeatedly initiating test circuit functions.

66. The apparatus according to claim 63 wherein the test circuit further comprises a circuit for isolating during testing thereof the first circuit from a circuit to which it is electrically coupled.

67. The apparatus according to claim 63 wherein at least part of the test circuit is integrated with the first circuit.

68. The apparatus according to claim 63 wherein the at least one elemental device is integrated with the first circuit.

69. The apparatus according to claim 63 wherein the at least one elemental device is part of the first circuit.

70. The apparatus according to claim 47 comprising a test circuit integrated with the integrated circuit for measuring a characteristic of first circuit and for determining the calibration data for resulting in the first analog control signal for resulting in approximately a predetermined operating characteristic and for storing within the programmable memory store; the determined calibration data for resulting in approximately the determined first analog control signal.

71. The apparatus according to claim 70 wherein the integrated test circuit comprises a circuit for varying the first analog control signal until the performance of the first circuit is within predetermined limits.

72. The apparatus according to claim 70 wherein the integrated test circuit comprises a circuit for isolating during testing Thereof the first circuit from a circuit to which it is electrically coupled.

73. The apparatus according to claim 70 wherein the integrated test circuit includes a timer for subsequently initiating again integrated test circuit functions.

74. The apparatus according to claim 70 comprising a trigger input port, the trigger input port for receiving a trigger signal for initiating functionality of the test circuit.

75. The apparatus according to claim 70 wherein at least part of the test circuit is integrated with the first circuit 76. The apparatus according to claim 47 further comprising mapping circuitry to determine a calibration data from a measured device characteristic of the first circuit.

77. A storage medium having stored therein data for1 when executed by a computer, resulting in a circuit design for an integrated circuit comprising:

an integrated circuit for performing a first circuit function and responsive to a control signal to support a first operating characteristic;

a memory store;

a circuit for providing a known current or voltage to at least one elemental device;

a circuit for measuring one or more elemental device parameters of the at least one elemental device while the known current or voltage is applied thereto;

a circuit for determining data for, when stored within a memory store and utilized by a control signal generating circuit, obtaining a first control signal for application as approximately the control signal; and, a circuit for storing the data within the memory store.

* * * * *